US011328080B2

(12) United States Patent
Christofferson et al.

(10) Patent No.: US 11,328,080 B2
(45) Date of Patent: May 10, 2022

(54) CRYPTOGRAPHIC KEY MANAGEMENT

(71) Applicant: FrostByte

(72) Inventors: Ransom Christofferson, Broomfield, CO (US); Nathan Johnston, Thornton, CO (US); Vikram Nagrani, Gibraltar (GI); Saul Schwartzbach, Superior, CO (US)

(73) Assignee: FrostByte, LLC, Thornton, CO (US)

( * ) Notice: Subject to any disclaimer, the term of this patent is extended or adjusted under 35 U.S.C. 154(b) by 104 days.

(21) Appl. No.: 16/798,491

(22) Filed: Feb. 24, 2020

(65) Prior Publication Data

US 2021/0150044 A1 May 20, 2021

Related U.S. Application Data

(60) Provisional application No. 62/936,836, filed on Nov. 18, 2019.

(51) Int. Cl.
*G06F 21/62* (2013.01)
*G06F 21/60* (2013.01)
*G06F 21/33* (2013.01)

(52) U.S. Cl.
CPC ........ *G06F 21/6218* (2013.01); *G06F 21/335* (2013.01); *G06F 21/602* (2013.01); *G06F 2221/2107* (2013.01)

(58) Field of Classification Search
CPC ... G06F 21/6218; G06F 21/335; G06F 21/602
(Continued)

(56) References Cited

U.S. PATENT DOCUMENTS 5,787,169 A * 7/1998 Eldridge ................ G06F 21/40
380/286
8,023,700 B2 9/2011 Riionheimo
(Continued)

FOREIGN PATENT DOCUMENTS

CN 108521418 9/2018
CN 108650231 10/2018
(Continued)

OTHER PUBLICATIONS

Unknown; "Shamir's Secret Sharing," Wikipedia, Nov. 18, 2020, 7 pages.
(Continued)

*Primary Examiner* — Jacob Lipman
(74) *Attorney, Agent, or Firm* — Scott P. Zimmerman, PLLC

(57) ABSTRACT

Sensitive electronic data may be encrypted using multiple identity credentials from multiple parties. Before the sensitive electronic data is encrypted, the multiple N identity credentials are input to a software application. Moreover, a minimum number $N_{min}$ of the N of the identity credentials are selected for decryption. The software application thus generates at least one of an encryption key and a decryption key as a keypair based on the N identity credentials and the minimum number $N_{min}$ of the identity credentials. The software application encrypts the sensitive electronic data using the encryption key to generate an encrypted version. Before decryption of the encrypted version, though, the software application may require input of the minimum number $N_{min}$ of the identity credentials. If the minimum number $N_{min}$ of the identity credentials are correctly input, the correct decryption key is generated and may be used to decrypt the encrypted version.

14 Claims, 39 Drawing Sheets

(58) Field of Classification Search
USPC .......................................................... 726/5
See application file for complete search history.

(56) References Cited

U.S. PATENT DOCUMENTS

| | | | |
|---|---|---|---|
| 9,722,790 | B2 | 8/2017 | Ebrahimi |
| 9,935,948 | B2 | 4/2018 | Schultz et al. |
| 10,007,913 | B2 | 6/2018 | Ebrahimi |
| 10,049,224 | B2 | 8/2018 | Momchilov et al. |
| 10,114,980 | B2 | 10/2018 | Barinov et al. |
| 10,142,110 | B2 | 11/2018 | Pizano |
| 10,289,865 | B1 | 5/2019 | Sokolov et al. |
| 2002/0013898 | A1* | 1/2002 | Sudia .................... G06Q 20/02 713/155 |
| 2004/0034769 | A1* | 2/2004 | Bacha .................. H04L 63/083 713/153 |
| 2008/0263363 | A1* | 10/2008 | Jueneman ............... G06F 21/32 713/184 |
| 2009/0228714 | A1 | 9/2009 | Fiske et al. |
| 2016/0191499 | A1* | 6/2016 | Momchilov .......... H04L 9/0863 713/171 |
| 2017/0134280 | A1 | 5/2017 | Davis |
| 2017/0300920 | A1 | 10/2017 | Dong et al. |
| 2017/0301033 | A1 | 10/2017 | Brown et al. |
| 2017/0310707 | A1 | 10/2017 | Amelchenko et al. |
| 2018/0183810 | A1 | 6/2018 | Jones et al. |
| 2019/0026496 | A1 | 1/2019 | Wilson |
| 2019/0164167 | A1 | 5/2019 | Embree |
| 2019/0251554 | A1 | 8/2019 | Ma et al. |
| 2019/0266576 | A1 | 8/2019 | McCauley et al. |
| 2019/0325436 | A1 | 10/2019 | Cheng et al. |

FOREIGN PATENT DOCUMENTS

| | | |
|---|---|---|
| CN | 109684858 | 4/2019 |
| CN | 106650344 | 5/2019 |

OTHER PUBLICATIONS

Avinash, M., et al. "Multi-level Security using QR Code, Biometrics and Password for Security Systems." International Journal of Engineering Science 6334 (2017).

Kroeger, Thomas M., et al. "The Case for Distributed Data Archival Using Secret Splitting with Percival," 2013 IEEE, 6 pages.

* cited by examiner

FIG. 21

Enter the passwords for your vault key

Enter at least as many passwords as is required by the vault key. The passwords may be entered in any order.

How many passwords will you enter?

3

Type password #1

Type password #2

Type password #3

Clear all inputs when encryption is finished

FIG. 24

Generate and encrypt the vault key

32

The passwords/passphrases that are used to encrypt the vault key are the same ones needed each time you wish to use the key.

Total number of passwords: (max: 35)

38

[ 5 ]

Minimum number of passwords required to use the vault key:

48

[ 3 ]

Password #1:

[ Type password #1 ]
[ Type password #1 again ]

Password #2:

[ Type password #2 ]
[ Type password #2 again ]

Password #3:

[ Type password #3 ]
[ Type password #3 again ]

Password #4:

[ Type password #4 ]
[ Type password #4 again ]

Password #5:

[ Type password #5 ]
[ Type password #5 again ]

☑ Clear all inputs when encryption is finished

[ Create vault key ]

Scan your vault key QR code

32

Scan the QR code that has this image:

Scan QR code | Take a photo of your QR code

Your encrypted vault key:

Scan your vault key QR code or paste the text contained in the QR code here

FIG. 29

32 — Enter new passwords

Total number of passwords: (max: 35)

38 — | 5 |

Minimum number of passwords required to use the vault key:

48 — | 3 |

Password #1:
- Type password #1
- Type password #1 again

Password #2:
- Type password #2
- Type password #2 again

Password #3:
- Type password #3
- Type password #3 again

Password #4:
- Type password #4
- Type password #4 again

Password #5:
- Type password #5
- Type password #5 again

☑ Clear all inputs when encryption is finished

[Re-encrypt vault key]

FIG. 30

32 — Create a QR code

Paste your encrypted vault key here

Print size:
Default (3.75" x 5")

+ Advanced options

Tile multiple copies when printing:
1

CRYPTOGRAPHIC KEY MANAGEMENT

CROSS-REFERENCE TO RELATED APPLICATION

This application claims domestic benefit of U.S. Provisional Application No. 62/936,836 filed Nov. 18, 2019 and incorporated herein by reference in its entirety.

BACKGROUND

Management of credentials is challenging for both organizations and individuals. Organizations and individuals have experienced great difficulty in using and in protecting passwords, cryptographic keys, and other data protection mechanisms. As the reader likely understands, credentials are easily lost, forgotten, stolen, or accidentally destroyed, thus jeopardizing the security and value of our sensitive/personal data.

Conventional credential management techniques have problems. Often a single, authorized person is responsible for handling sensitive data, and that person thereby becomes a single point of failure from a security perspective. The single, authorized person may simply forget the credentials (such as a decryption password), thus perhaps rendering encrypted data forever lost. Even in instances where multiple, authorized individuals (such as in an enterprise or other organization) are given access to, and management responsibility of, sensitive data, a single decryption password is still usually shared between them, leading to an even greater security exposure. Furthermore, when any one of the authorized individuals departs the organization (whether by termination, retirement, or death), the organization has difficulty accessing and/or retaining ownership of credentials for accessing sensitive data.

Still more problems arise. Even if an individual or enterprise organization implements true best practices (such as cold storage data access and management), encryption and/or decryption information still needs to regularly change and multiple backup copies must be kept. Indeed, in an enterprise environment, multiple copies are required in several secure locations, with single use addresses/keys/passwords and proper management of current version control in each location after encryption/re-encryption. Challenges also exist with the enforcement of data security policies governing retrieval and use of private keys/passwords, making sure that no single person (not even the CEO) may individually retrieve sensitive data.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 16-22 are screenshots illustrating an encryption operation, according to exemplary embodiments;

FIGS. 23-25 are screenshots illustrating a creation of a vault key, according to exemplary embodiments;

FIGS. 26-30 are screenshots illustrating a re-encryption of the vault key 40, according to exemplary embodiments;

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
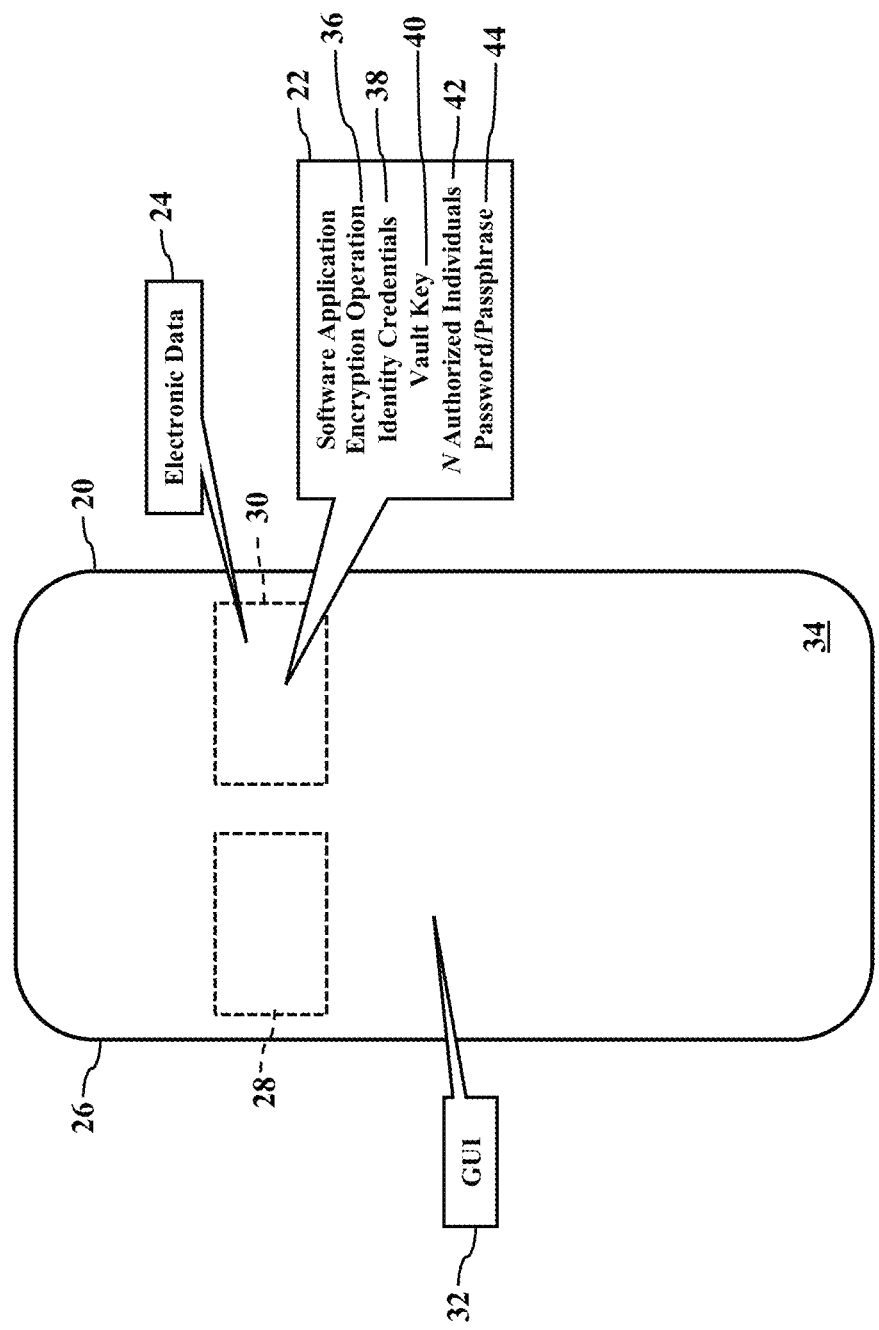
FIGS. 1-13 are simplified illustrations of a multi-user credential mechanism for protecting an electronic data, according to exemplary embodiments.

FIGS. 1-13 are simplified illustrations of a multi-user credential mechanism for protecting an electronic data 24, according to exemplary embodiments. A device 20 executes a software application 22 to encrypt an electronic data 24. While the device 20 may be any computer, server, laptop, tablet, or other processor-controlled device, most readers are familiar with mobile computing. FIG. 1 thus illustrates the device 20 as a mobile smartphone 26. The smartphone 26 has a hardware processor 28 that executes the software application (or "app") 22 locally stored in a hardware memory device 30. The software application 22 may be preloaded or may be downloaded from the Internet (such as the Apple App Store, Google Play, any website, or digital distribution platform). When a user of the smartphone 26 wishes to perform encryption, the user opens or initiates the software application 22. As the smartphone 26 executes the software application 22, the software application 22 causes the smartphone 26 to display a graphical user interface (or "GUI") 32 via a capacitive touch screen display device 34 (or any other display technology). The user may thus tactilely select or request an encryption operation 36. The software application 22 then presents a series or sequence of prompts (via the graphical user interface 32) to input multiple identity credentials 38 from, or associated with, multiple users. Once the software application 22 receives the multiple identity credentials 38, the software application 22 causes or instructs the smartphone 26 to create a cryptographic vault key 40 based on the identity credentials 38 associated with the multiple users. Once the vault key 40 is created, the smartphone 26 then encrypts the electronic data 24 using the vault key 40.

An enterprise example helps explain the vault key 40. Suppose a business wishes to encrypt its electronic data 24 for security precautions. The electronic data 24 may be employee personal records (perhaps containing social security numbers and other personally identifying information), trade secrets, customer lists, security codes and passwords, and legal/accounting/financial information. Whatever the electronic data 24, suppose the business enterprise tasks a particular group of users (e.g., executives/managers/employees) to protect the company's electronic data 24. The business enterprise may thus authorize the particular group of users, in a representative capacity, to encrypt the company's electronic data 24 using their identity credentials 38. The business enterprise thus empowers an integer number N of its executives/managers/employees as authorized individuals 42 to encrypt the company's electronic data 24 using their individual identity credentials 38. As the smartphone 26 executes the software application 22, the software application 22 causes or instructs the smartphone 26 to generate the graphical user interface 32 for inputting each authorized individual's identity credentials 38. While the software application may accept electronic data representing a facial recognition scan, fingerprint scan, and voice/audio recognition, most readers are familiar with passwords and passphrases. Exemplary embodiments may thus require that each N authorized individual 42 enter or type her/his respective password/passphrase 44 (perhaps via the touch screen display device 34, keypad, keyboard, or other input device).

Figure 2:
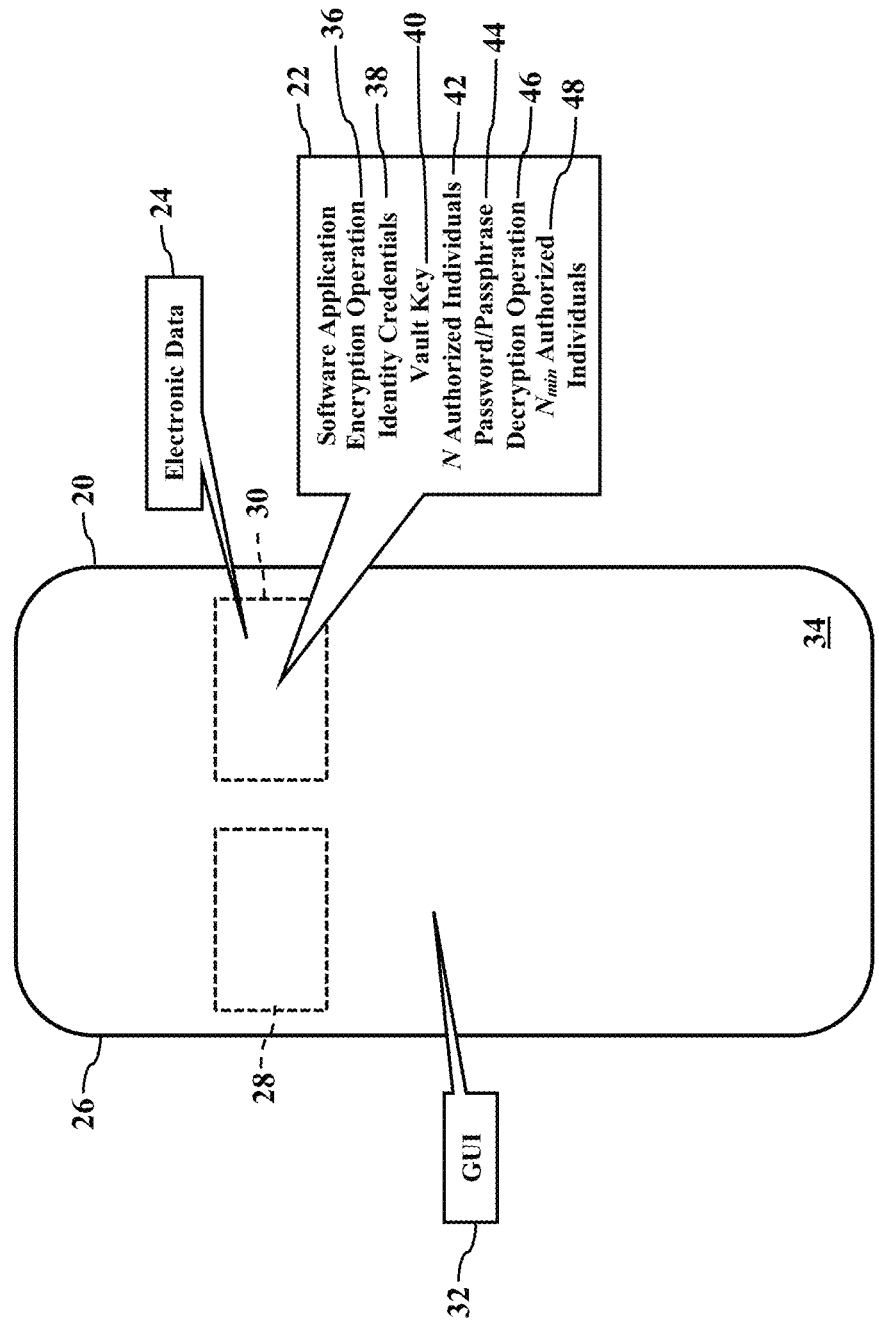

FIG. 2 illustrates organizational precautions. Even though the N authorized individuals 42 are authorized to encrypt the company's electronic data 24, organizations and personnel change. That is, as time passes, executives/managers/employees come and go, due to termination, retirement, or perhaps death. So, even though the company may designate the N (greater than N=2) authorized individuals 42 for encrypting the company's electronic data 24, the company's security procedures may future-proof decryption against personnel changes. The company may thus permit only a subset or subgroup $N_{min}$ (illustrated as reference numeral 48) of the N authorized individuals 42 for decryption. In other words, all of the current N authorized individuals 42 may be required to input their corresponding N identity credentials 38 (e.g., the passwords/passphrases 44) to encrypt the company's electronic data 24. However, a decryption operation 46 (which later paragraphs will explain) may only require the lesser, minimum number $1 \leq N_{min} \leq N$ of the authorized individuals 42 to input their corresponding $N_{min}$ (illustrated as reference numeral 48) identity credentials 38.

Another example is helpful. Suppose the company authorizes three (3) officers (e.g., CEO, COO, and CTO) to encrypt its electronic data 24. The software application 22 may thus require that the three (3) officers input their corresponding three (3) identity credentials 38. However, because any of the three (3) officers may depart the company, the company may permit the lesser, minimum number $N_{min}$ 48 of the officers to decrypt. As FIG. 2 illustrates, when the software application 22 generates the graphical user interface 32 for display, the graphical user interface 32 may also prompt for, and/or have a graphical control for selecting, the minimum number $N_{min}$ 48. In this example, because only the three (3) officers are empowered as the N authorized individuals 42, perhaps only two (2) or less of the officers would be required to input their corresponding $N_{min}$ 48 identity credentials 38 for decryption. Later, if anyone (1) of the three (3) officers is no longer authorized or available, the electronic data 24 may still be decrypted without having all the three (3) identity credentials 38. Instead, only two (2) of the identity credentials 38 would be required to perform the decryption operation 46. The user of the smartphone 26 may thus navigate the touch screen display device 38 and input her/his selection of the $N_{min}$ 48, with $N_{min}=N-1$ or $N-n$, where n is any integer number of the authorized individuals 42. The software application 22 receives an input or signal representing the user's selection of the $N_{min}$ 48 and uses the selection to generate the vault key 40.

Figure 3:
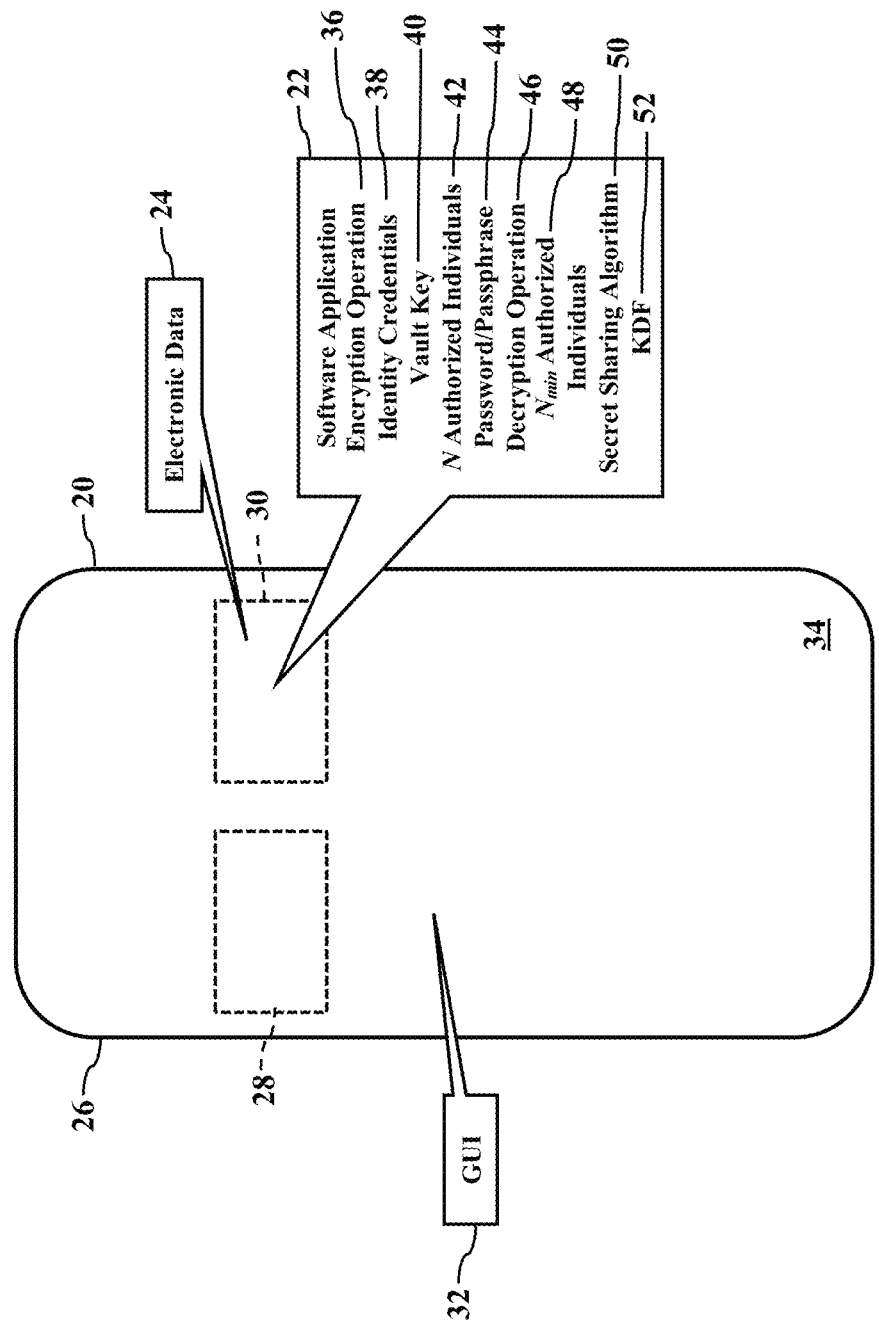

FIG. 3 further illustrates the vault key 40, according to exemplary embodiments. The vault key 40 may thus be used to generate at least one encryption key that is created from the N identity credentials 38 (e.g., the N passwords/passphrases 44). However, because the software application 22 was configured to only require the minimum number $N_{min}$ 48 of the identity credentials 38 for decryption, the vault key 40 may be generated using a secret sharing algorithm 50 and a key derivation function (or "KDF") 52. The software application 22 calls and applies the secret sharing algorithm 50 to generate at least one share of all the N passwords/passphrases 44 according to the subset or subgroup $N_{min}$ 48. The software application 22 may also call the key derivation function 52 to derive the vault key 40 from the at least one share of the N passwords/passphrases 44. There are known secret sharing algorithms and key derivation functions, and exemplary embodiments may use any secret sharing algorithm and key derivation function to create the vault key 40. Once the vault key 40 is generated, an electronic representation of the vault key 40 may be stored in the hardware memory device 30 for usage and for later retrieval.

Any secret sharing scheme may be utilized. The reader is perhaps familiar with Shamir's Secret Sharing Algorithm, which is a well-known cryptographic algorithm. Exemplary embodiments may thus divide the N identity credentials 38 (e.g., the N passwords/passphrases 44) into unique parts, shards, or shares, with each individual share being different from other shares. Because the N identity credentials 38 may be split into multiple shares, the minimum number $N_{min}$ 48 of the identity credentials 38 must be known and entered before decryption is performed. If someone has fewer than the required number of shards (e.g., the minimum number $N_{min}$ 48), they can learn absolutely nothing about the original, sharded information. However, there are many secret sharing or splitting schemes and algorithms for distributing a secret, and exemplary embodiments may be applied regardless of any particular scheme or algorithm.

Figure 4:
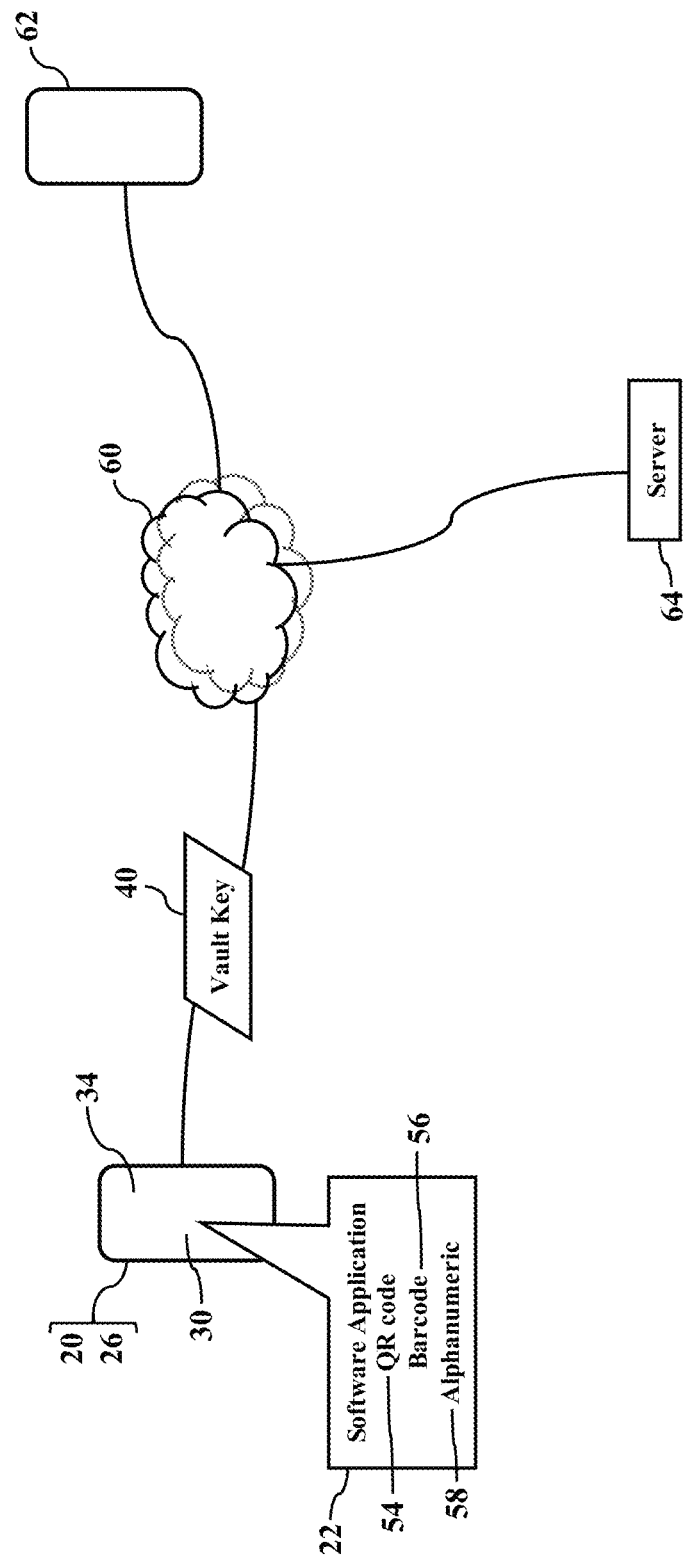

FIG. 4 illustrates distribution of the vault key 40, according to exemplary embodiments. Because the vault key 40 is locally stored in the device 20, the vault key 40 may be retrieved, displayed, physically printed, and/or communicated. The device 20, for example, may process the vault key 40 for display (perhaps via the touch screen display device 34). The smartphone 26 may output the vault key 40 for physical printing on paper. While the vault key 40 may be displayed/printed using any medium, means, or form, most readers understand that the vault key 40 may be displayed/printed as any output (e.g., a QR code 54, a bar code 56, an alphanumeric text 58, an image, and/or any other electronic or physical representation). Because the vault key 40 is electronically stored in the hardware memory device 30, the vault key 40 may also be retrieved and communicated via a communications network 60 to any network address or destination (e.g., Internet protocol address) and/or to any device/party/user. The vault key 40 may thus be wired/wirelessly transmitted via any electronic message (e.g., Internet protocol, email, SMS/MMS text, instant) to any device 62 (such as any smartphone associated with the other N authorized individuals 42). The vault key 40, in other words, may be distributed from the smartphone 26 and shared with any or all of the N authorized individuals 42. Because the vault key 40 may be electronically stored and communicated, the vault key 40 may also be sent via the communications network 60 to any network address or destination (e.g., Internet protocol address) associated with a remote server 64 for archival storage. Simply put, the vault key 40 may be physically printed and physically stored onsite and/or offsite for offline protection. The vault key 40 may additionally or alternatively be electronically transferred and remotely stored for online archival.

Figure 5:
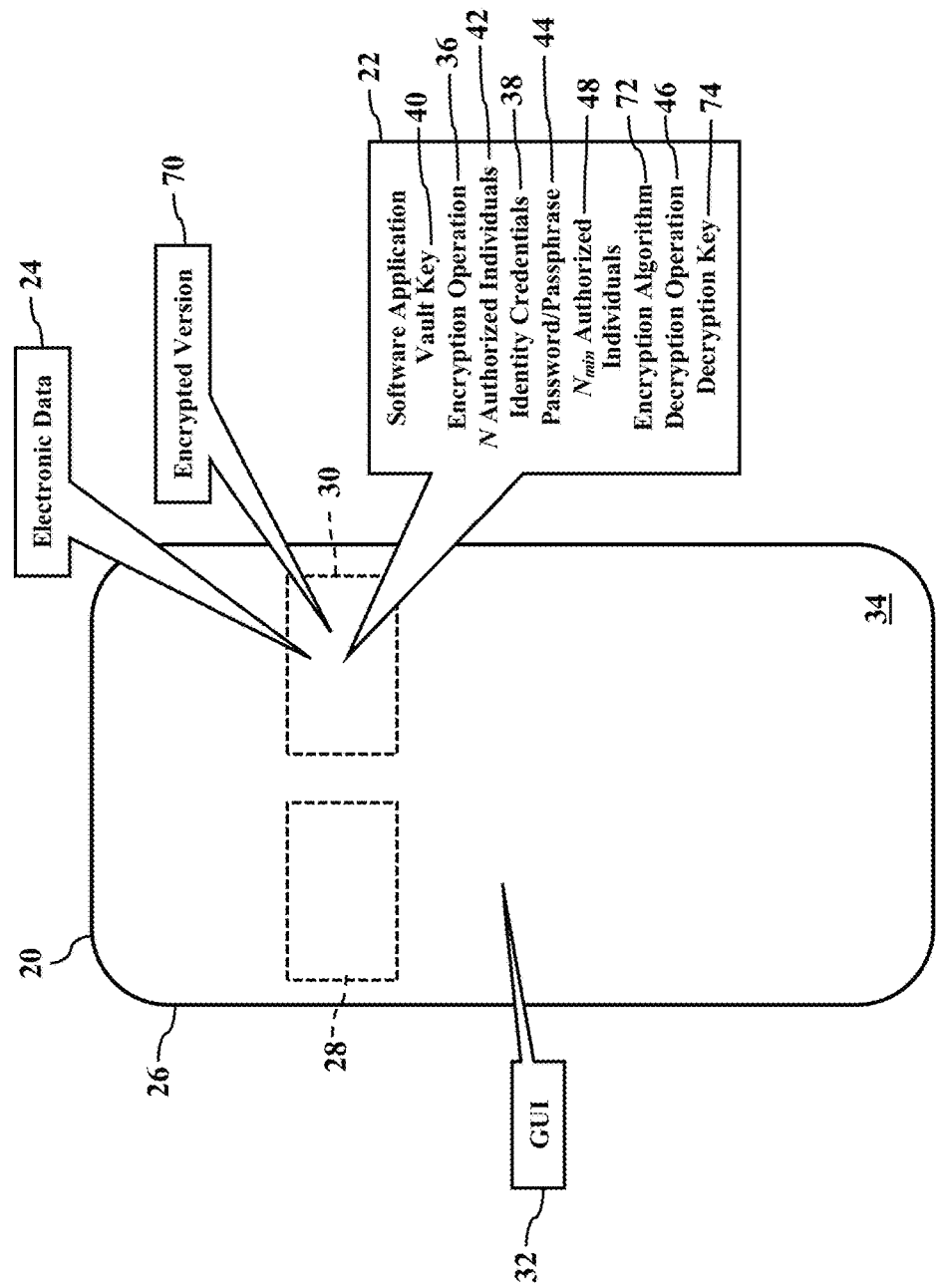

FIG. 5 illustrates encryption of the electronic data 24, according to exemplary embodiments. Once the vault key 40 is created, the software application 22 may then generate an encrypted version 70 of the electronic data 24. The software application 22 causes or instructs the hardware processor 28 to perform operations, such as obtaining the electronic representation of the vault key 40. The software application, for example, may retrieve the vault key 40 from the hardware memory device 30 of the smartphone 26. The software application 22, alternatively, may require the vault key 40 as an input prior to performing the encryption operation 36. The software application 22, for example, may prompt for the user to physically present the vault key 40 (such as by scanning the QR code 54, scanning the bar code 56, or capturing a digital image representing the vault key 40). Once the software application 22 obtains the vault key 40, the software application 22 may optionally require that some or all of the N authorized individuals 42 input their respective identity credential 28 (such as their password/passphrase 44). For example, because the software application 22 was configured to only require the subset or subgroup $N_{min}$ 48 of the identity credentials 38. That is, the minimum number $N_{min} \leq N$ of the authorized individuals 42 may be required to input their corresponding $N_{min}$ 48 identity credentials 38. The software application 22 may then call or invoke an encryption algorithm 72. The encryption algorithm 72 uses the vault key 40 as an encryption parameter. The encryption algorithm 72 may be symmetric or asymmetric and may use the vault key 40 as one key of a keypair. The encryption algorithm 72 may thus encrypt the electronic data 24 using the vault key 40, but a different key (perhaps a decryption key 74) is required for the decryption operation 46 (as later paragraphs will explain).

The encryption operation 36 may use the AES-256 (CBC mode) symmetric encryption algorithm, which has long been trusted by security professionals and governments. Even if some rogue entity gains access to backed-up data (such as the encrypted version 70), the rogue entity can learn absolutely nothing about the encrypted information without the vault key 40, the decryption key 74, and/or the minimum number $N_{min}$ 48 of the identity credentials 38. The encryption operation 36 may also use the scrypt algorithm to derive the encryption key from any one or more of the N or the $N_{min}$ passwords/passphrases. The scrypt algorithm is a well-known slow hashing algorithm which makes it completely unfeasible for attackers to discover/find the decryption key 74 by brute force.

Figure 6:
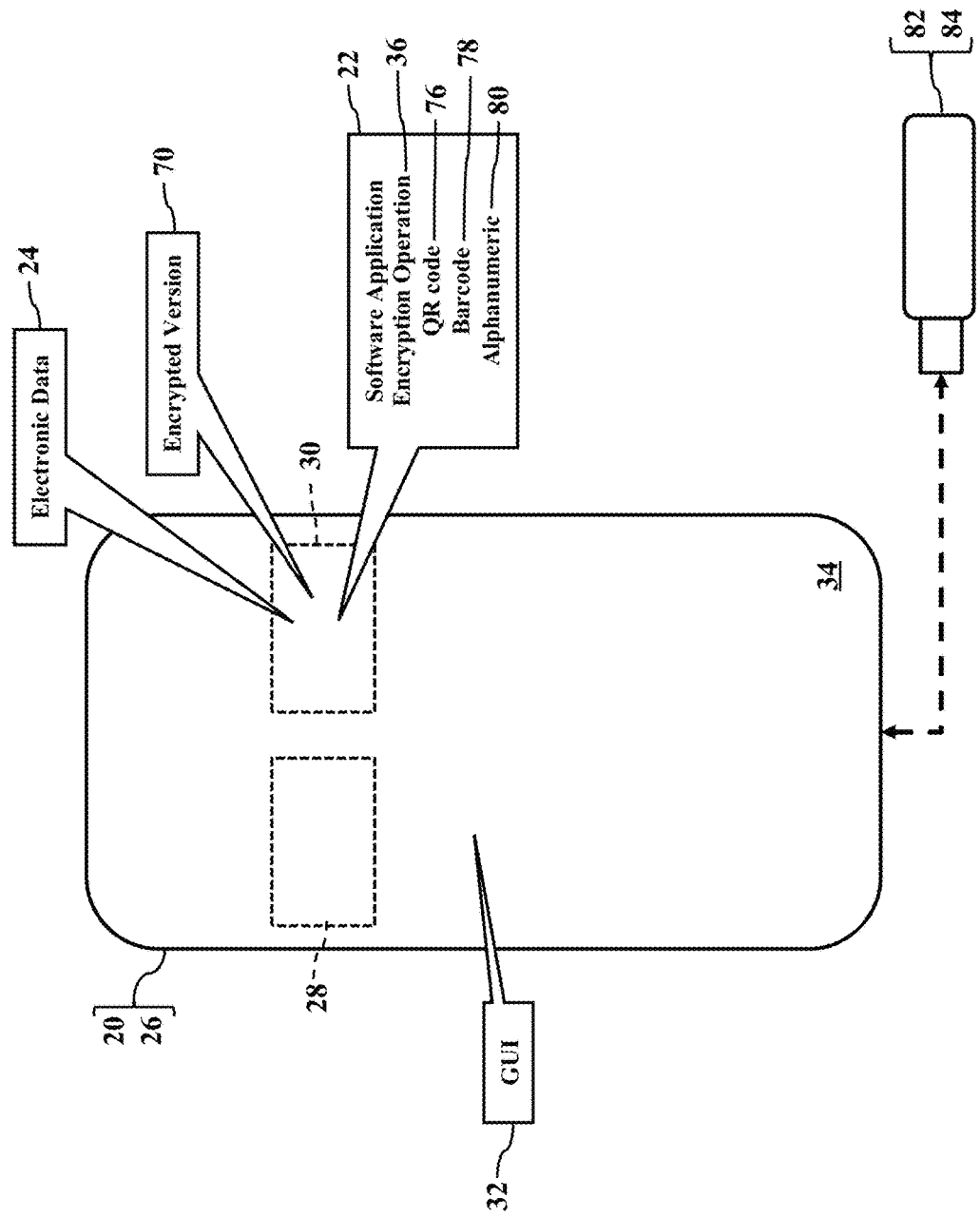
Figure 7:
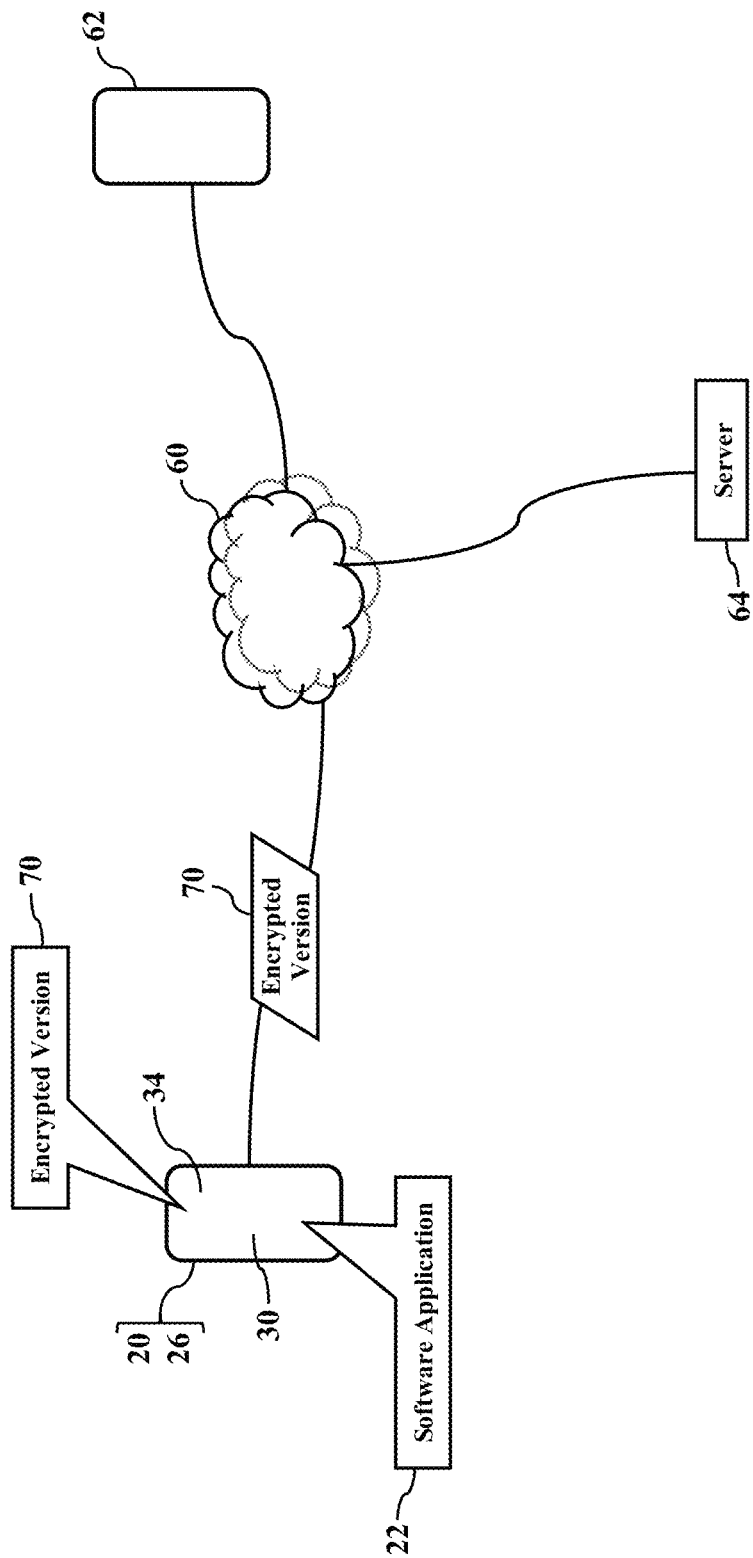

FIGS. 6-7 also illustrate encryption of the electronic data 24. After the software application 22 generates the encrypted version 70 of the electronic data 24, the encrypted version 70 may be locally stored in the hardware memory device 30 of the smartphone 26. The encrypted version 70 of the electronic data 24 may thus be retrieved, displayed, physically printed, and/or communicated. For example, the encrypted version 70 may be processed for display and/or physical printing as a QR code 76, a barcode 78, an alphanumeric text 80, an image, and/or any other electronic or physical representation. Because the encrypted version 70 is electronically stored in the hardware memory device 30, the encrypted version 70 may also be retrieved and stored to a local/peripheral/removable storage device 82 (such as a USB flash (or "thumb") drive 84) for offline storage. However, as FIG. 7 illustrates, the encrypted version 70 may also be retrieved and communicated via the communications network 60 to any network address or destination (e.g., Internet protocol address) and/or to any device/party/user. The encrypted version 70 may thus be wired/wirelessly transmitted via any electronic message (e.g., Internet protocol, email, SMS/MMS text, instant) to any device 62 (such as any smartphone associated with the other N authorized individuals 42). The encrypted version 70, in other words, may be distributed from the smartphone 26 and shared with any or all of the N authorized individuals 42. Because the encrypted version 70 may be electronically stored and communicated, the encrypted version 70 may also be sent via the communications network 60 to any network address or destination (e.g., Internet protocol address) associated with the remote server 64 for archival storage. Simply put, the encrypted version 70 may be physically printed and physically stored onsite and/or offsite for offline protection. The encrypted version 70 may additionally or alternatively be electronically transferred and remotely stored for online archival.

Figure 8:
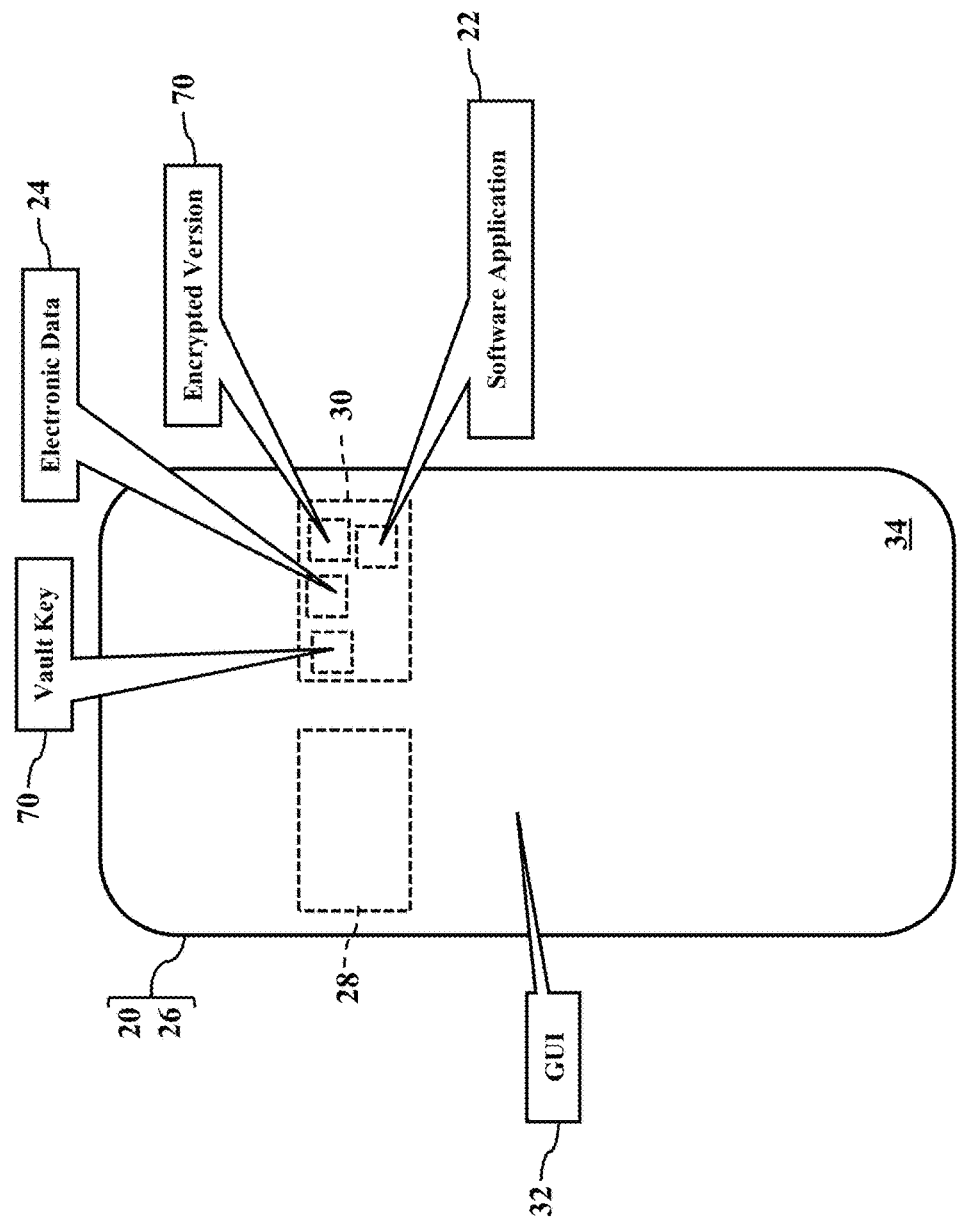

FIG. 8 illustrates storage of the encrypted version 70. After the software application 22 generates the encrypted version 70 of the electronic data 24, the software application 22 may direct the hardware processor 28 to store the encrypted version 70 to the hardware memory device 30. The encrypted version 70, for example, may be separately stored from the electronic data 24, separately stored from the identity credentials 38, and/or separately stored from the vault key 70. That is, even though the hardware memory device 30 may locally store the electronic data 24, the identity credentials 38, the vault key 40, and the encrypted version 70, the data or information 24, 38, 40 and 70 may be stored in separate hierarchical file structures and/or separate hardware portions (RAM, non-volatile). Hardware and/or software flags, parameters, or configurations may restrict access/retrieval/usage to only the software application 22.

Exemplary embodiments thus present an elegant solution of vaulting. The identity credentials 38 may be separated, or separately stored, from the electronic data 24 to be encrypted. The vault key 40 may additionally or alternatively be separated, or separately stored, from the electronic data 24 to be encrypted. The identity credentials 38 and/or the vault key 40 may thus be completely separate from the electronic data 24 to be encrypted. This backup method was created with the intention of solving the enterprise pain points with offline key management as discussed above. The software application 22 thus allows for centralized, multi-user encryption/decryption credential management of offline assets where the encrypted version 70 may be encrypted, kept offline, and is separate from the decryption credential sets. There is no centralized or local database of any kind for users, or for passwords, thereby enabling all the benefits of centralized credential management without any of the conventional risks. All credential management and data encryption can be done completely offline without Internet/network access. The software application 22 allows for multi-user governance and security which eliminates a single point of failure. The software application 22 allows for recovery of the encrypted version 70 of the electronic data 24 in the event of tragedy or team member/credential loss. Moreover, the software application 22 allows for automated version control of completely offline data, thereby being the first software solution to address the cumbersome process of offline key management at scale.

Exemplary embodiments may thus generate a cryptographic keypair. The multiple N identity credentials 38 and the minimum number $N_{min}$ 48 of the identity credentials may be used to derive the vault key 40. The vault key 40 may then be used to encrypt and decrypt, as explained. The multiple N identity credentials 38, the vault key 40, and/or the minimum number $N_{min}$ 48 of the identity credentials may also be used to derive an encryption key and the decryption key 74. Any of the vault key 40, the encryption key, and/or the decryption key 74 may be generated and locally stored by the software application 22 and/or identified and cryptographically used as keypairs. Encryption may require input of the minimum number $N_{min}$ 48 of the identity credentials. If the minimum number $N_{min}$ 48 of the identity credentials are correctly input, the correct decryption key 74 is generated and may be used to decrypt the encrypted version 70.

Figure 9:
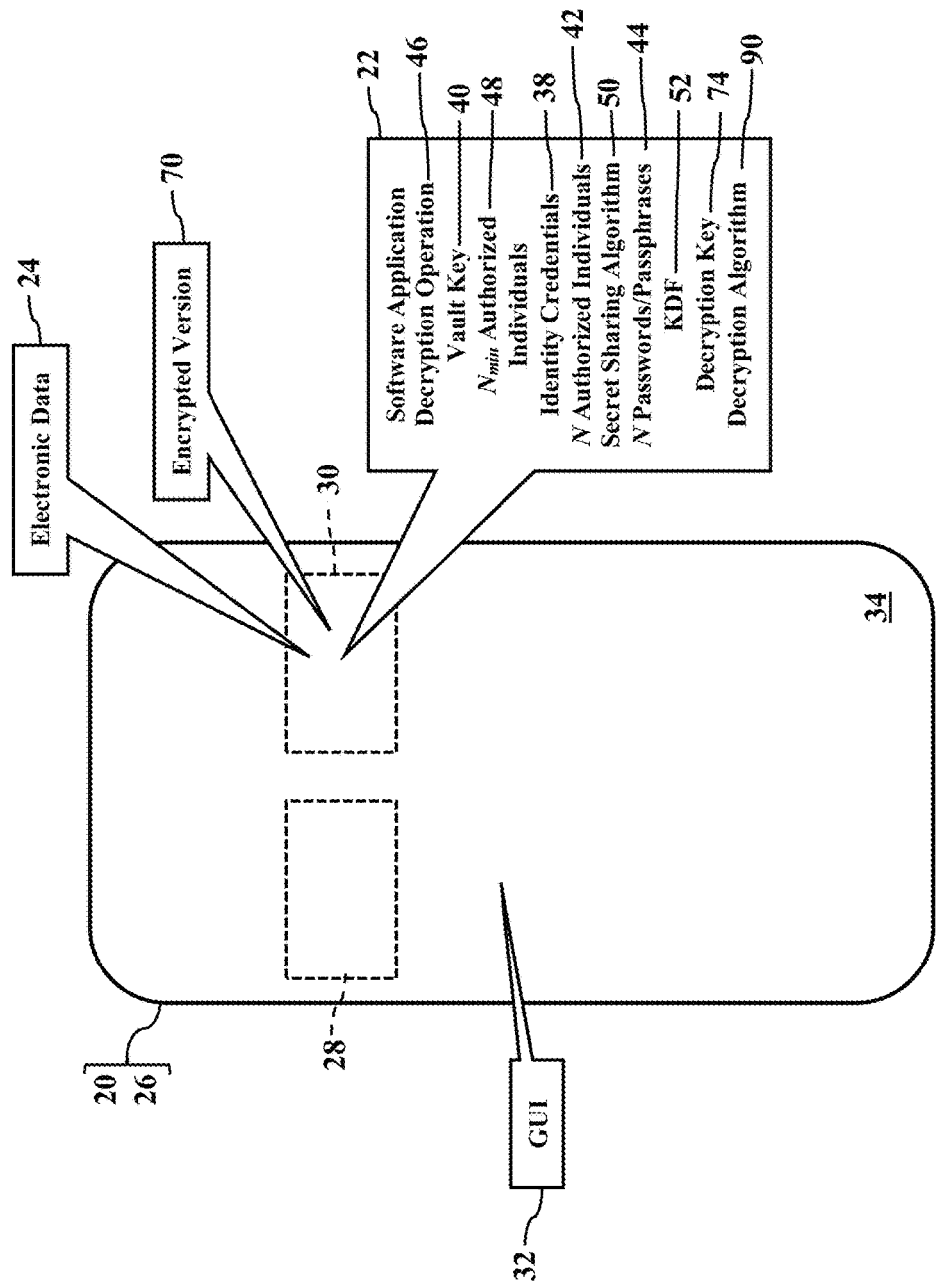

FIG. 9 illustrates the decryption operation 46. When any of the N authorized individuals 42 wishes to perform a decryption, the user of the device 20 (again illustrated as the smartphone 26) opens or initiates the software application 22. As the smartphone 26 executes the software application 22, the software application 22 causes the smartphone 26 to display the graphical user interface (or "GUI") 32 via the capacitive touch screen display device 34. The user may thus tactilely select or request the decryption operation 46. The software application 22 may present a first prompt (via the graphical user interface 32) for an input of the vault key 40. The user, for example, may navigate a hierarchical file structure to a memory location storing the electronic representation of the vault key 40. The software application 22 may thus retrieve the vault key 40 from the hardware memory device 30 of the smartphone 26. The software application 22, alternatively, may require the vault key 40 as an input prior to performing the decryption operation 46. The software application 22, for example, may prompt for the user to physically present the vault key 40 (such as by scanning the QR code 54, scanning the bar code 56, or capturing a digital image representing the vault key 40). Once the software application 22 obtains the vault key 40, the software application 22 may proceed with the decryption operation 46.

The software application 22 may perform a check. The software application 22 may compare the current version of the vault key 40 to a historical version of the vault key 40 (perhaps created during the encryption operation 36). If the current version substantially matches, equals, or satisfies the historical version, then the software application 22 may be configured to proceed with the decryption operation 46. As one example, the QR code 54 or barcode 56 representing the current version must substantially match or equal the QR code 54 or barcode 56 representing the historical version. As another example, the software application 22 may be configured to call or invoke a hashing algorithm. The hashing algorithm may generate hash values by hashing the historical version of the vault key 40 and by hashing the current version of the vault key 40. The software application 22 may then compare the hash values. The hash value representing the current version may or must substantially match or equal the hash value representing the historical version. If a substantial or exact match is determined, then the software application 22 may be configured to proceed with the decryption operation 46. However, if the hash value representing the current version fails to substantially match, equal, or satisfy the hash value representing the historical version, then the software application 22 may be configured to not proceed with the decryption operation 46.

Private credentials may also be required. Recall that, during the encryption operation 36, the minimum number $N_{min}$ 48 was previously selected (as explained with reference to FIGS. 2-5). When executing the decryption operation 46, the software application 22 may thus present a series or sequence of prompts to input the minimum number $N_{min}$ 48 of the identity credentials 38 that were used to create the vault key 40. The minimum number $N_{min}$ 48 of the N authorized individuals 42 thus type or enter (perhaps via the capacitive touch screen display 34) their respective identity credentials 38. Once the software application 22 receives the $N_{min}$ 48 of the identity credentials 38, the software application 22 causes or instructs the smartphone 26 to recreate all the N identity credentials 38. That is, the software application 22 calls or invokes the secret sharing algorithm 50 to recreate all the N passwords/passphrases 44 using the shares representing the minimum number $N_{min}$ 48 entered. Once all the N passwords/passphrases 44 have been re-created using the secret sharing algorithm 50, the software application 22 calls or invokes the key derivation function 52 to derive the decryption key 74. The software application 22 may then call a decryption algorithm 90 that uses the decryption key 74 as a decryption parameter to generate a decrypted version from the encrypted version 70. In other words, if the minimum number $N_{min}$ 48 of the N identity credentials 38 are correctly entered, the decryption key 74 is correctly created and will successfully decrypt the encrypted version 70, thus reproducing the electronic data 24.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

Figure 10:
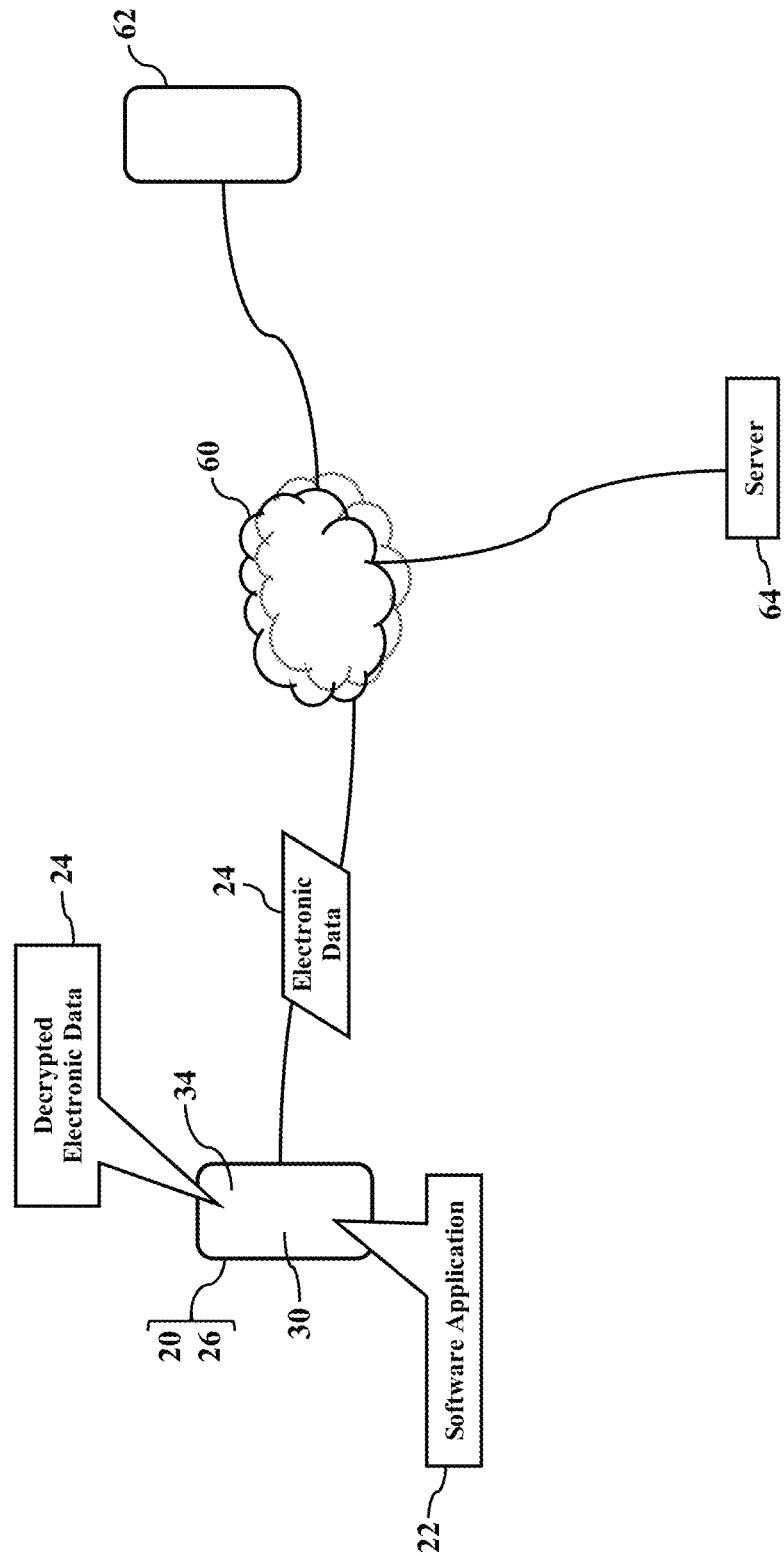

FIG. 10 illustrates distribution of the decrypted electronic data 24. After the device 20 (e.g., the smartphone 26) performs the decryption operation 46, the decrypted electronic data 24 may be retrieved from the hardware memory device 30 and displayed, physically printed, and/or communicated. The smartphone 26, for example, may process the electronic data 24 for display (perhaps via the touch screen display device 34). The smartphone 26 may output the electronic data 24 for physical printing on paper. Moreover, the decrypted electronic data 24 may also be retrieved and communicated via the communications network 60 to any network address or destination (e.g., Internet protocol address) and/or to any device/party/user. The decrypted electronic data 24 may thus be wired/wirelessly transmitted via any electronic message (e.g., Internet protocol, email, SMS/MMS text, instant) to the device 62 (such as any smartphone associated with the other N authorized individuals 42). The decrypted electronic data 24, in other words, may be distributed from the smartphone 26 and shared with any or all of the N authorized individuals 42. Because the decrypted electronic data 24 may be electronically stored and communicated, the decrypted electronic data 24 may also be sent via the communications network 60 to any network address or destination (e.g., Internet protocol address).

Figure 11:
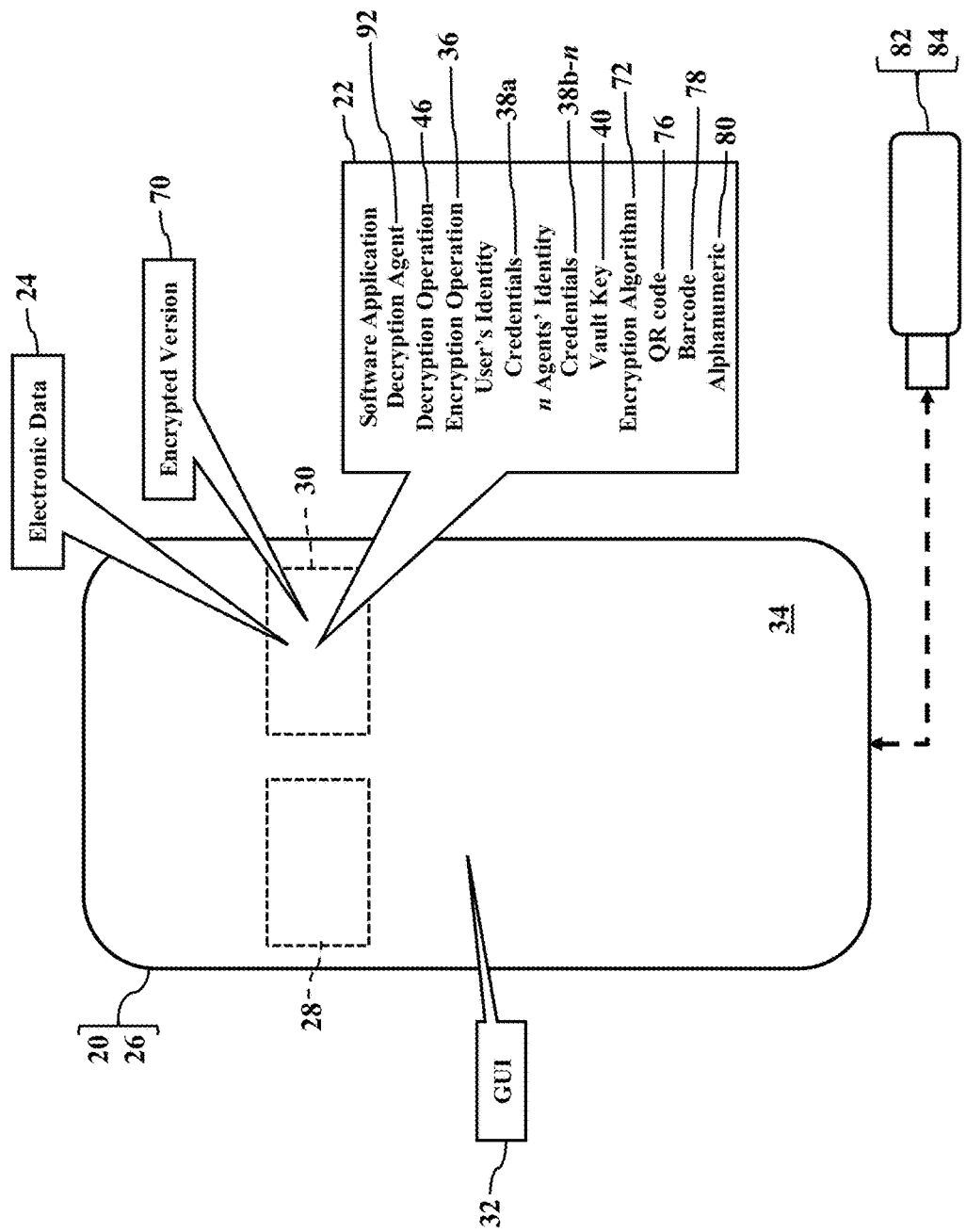
Figure 12:
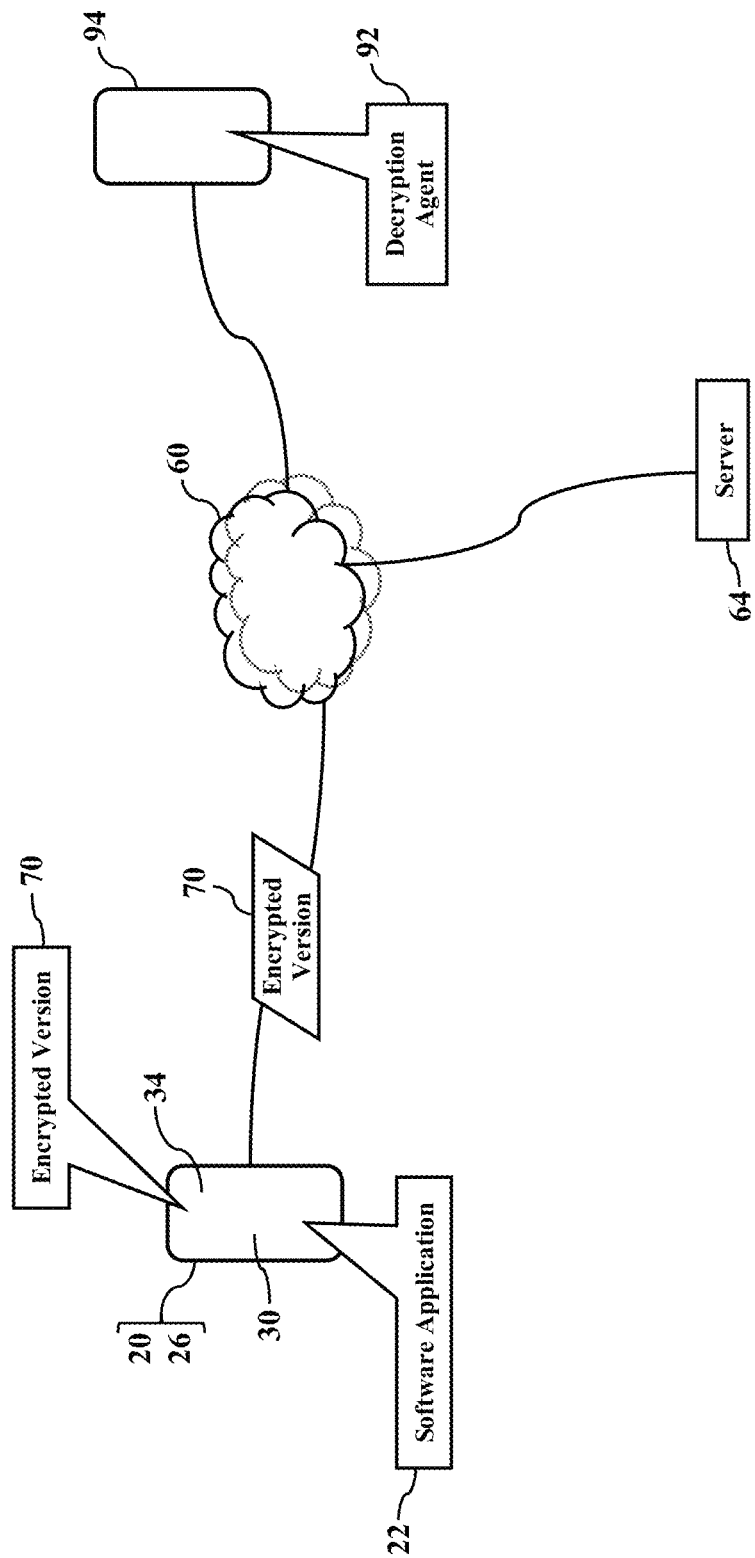
Figure 13:
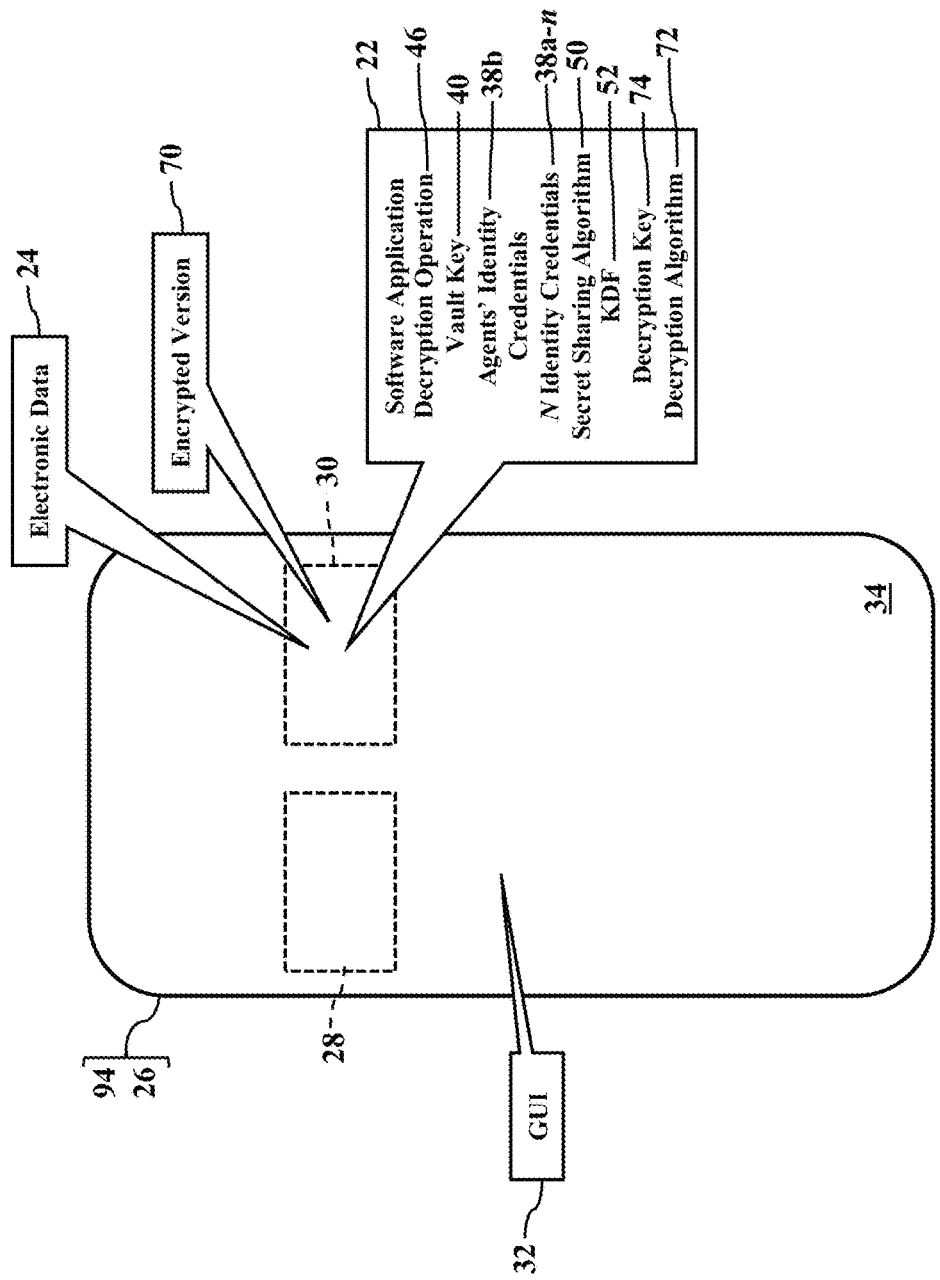

FIGS. 11-13 illustrate individual encryption of a user's electronic data 24. When a single person/user wishes to encrypt her/his personal information (again illustrated as the electronic data 24), the single person/user may appoint a trusted friend, surrogate, or proxy for decryption. That is, even though the single person/user owns the electronic data 24, the user, as a security precaution, may designate one or more trusted parties as decryption agents 92. Should the user (e.g., the owner of the electronic data 24) lose or forget her password/passphrase 44, or be unable to perform or to complete the decryption operation 46, the decryption agent 92 may enter her/his identity credentials 38 and decrypt the encrypted version 70 of the owner's electronic data 24. So, when the individual user selects the encryption operation 36, the software application 22 may prompt for the user's identity credentials 38a and for the identity credentials 38b-n that are associated with n decryption agents 92. Once the software application 22 receives the user's identity credentials 38a and the agents' identity credentials 38b-n, the software application 22 generates the vault key 40. The software application 22 calls and applies the secret sharing algorithm 50 to generate at least one share of all the N=n+1 identity credentials 38a-n, with any one (1) or more of the agents' identity credentials 38b-n able to decrypt. Once the vault key 40 is generated, an electronic representation of the vault key 40 may be stored in the hardware memory device 30 for usage and for later retrieval. The vault key 40 may optionally be distributed to any or all of the decryption agent(s) 92. The owner/user selects the electronic data 24 to be encrypted, and the software application 22 generates the encrypted version 70 by encrypting the electronic data 24 using the vault key 40 as an encryption parameter to the encryption algorithm 72. The software application 22 also causes the device 20 to locally store the encrypted version 70 of the electronic data 24 in the solid-state memory device 30. The encrypted version 70 of the electronic data 24 may thus be retrieved, displayed, physically printed, and/or communicated. As this disclosure above explained, the encrypted version 70 may be processed for display and/or for physical printing (such as the QR code 76, the barcode 78, the alphanumeric text 80, or any other electronic or physical representation). Moreover, the encrypted version 70 may also be retrieved and stored to the local/peripheral/removable storage device 82 (such as the USB flash drive 84) for offline storage.

FIG. 12 illustrates distribution. The encrypted version 70 may also be retrieved and communicated via the communications network 60 to any network address or destination (e.g., Internet protocol address) and/or to any device/party/user. The encrypted version 70 may thus be wired/wirelessly transmitted via any electronic message (e.g., Internet protocol, email, SMS/MMS text, instant) to any device 94 (such as any smartphone associated with the decryption agent(s) 92). The encrypted version 70, in other words, may be distributed from the smartphone 26 and shared with any or all of the n decryption agent(s) 92. Because the encrypted version 70 may be electronically stored and communicated, the encrypted version 70 may also be sent via the communications network 60 to any network address or destination for archival/remote storage (such as the Internet protocol address associated with the remote server 64). The encrypted version 70 may be physically printed and physically stored onsite and/or offsite for offline protection. The encrypted version 70 may additionally or alternatively be electronically transferred and remotely stored for online archival.

FIG. 13 illustrates agent decryption. Should anything happen to the individual owner of the electronic data 24, any of the decryption agent(s) 92 may unlock or decrypt the encrypted version 70 of the owner's electronic data 24. Suppose, for example, that the decryption agent's device 94 is also the smartphone 26 that downloads and stores the software application 22. The decryption agent 92 tactilely opens or initiates the software application 22 and selects or requests the decryption operation 46. The software application 22 may optionally prompt the decryption agent 92 to select or to input the vault key 40. As a security measure, the software application 22 may be configured to first require that the decryption agent 92 scan the vault key 40 (e.g., the QR code 76, the barcode 78, the alphanumeric text 80, or any other electronic or physical representation). The decryption operation 46 may thus require that the decryption agent 92 possess a physical copy of the vault key 40. The software application 22 may additionally or alternatively prompt the decryption agent 92 to input her/his agent's identity credentials 38b (such as the password/passphrase 44) that was previously used to create the vault key 40. Once the software application 22 receives any one (1) or more of the agent's identity credentials 38b-n, the software application 22 causes or instructs the smartphone 26 to recreate all the N=n+1 identity credentials 38a-n (e.g., the user's identity credentials 38a and/or the n agents' identity credentials 38b-n). The software application 22 calls and applies the secret sharing algorithm 50 and the key derivation function ("KDF") 52 to decrypt the encrypted version 70 (using the decryption key 74 as a decryption parameter to the decryption algorithm 72). The owner's electronic data 24 is thus reproduced from the encrypted version 70. The encrypted version 70 of the owner's electronic data 24 is thus tethered to the passwords/passphrases 44 of the decryption agent(s) 92. Any of the decryption agents 92 may unlock the owner's encrypted version 70 (e.g., encrypted data vault).

Figure 14:
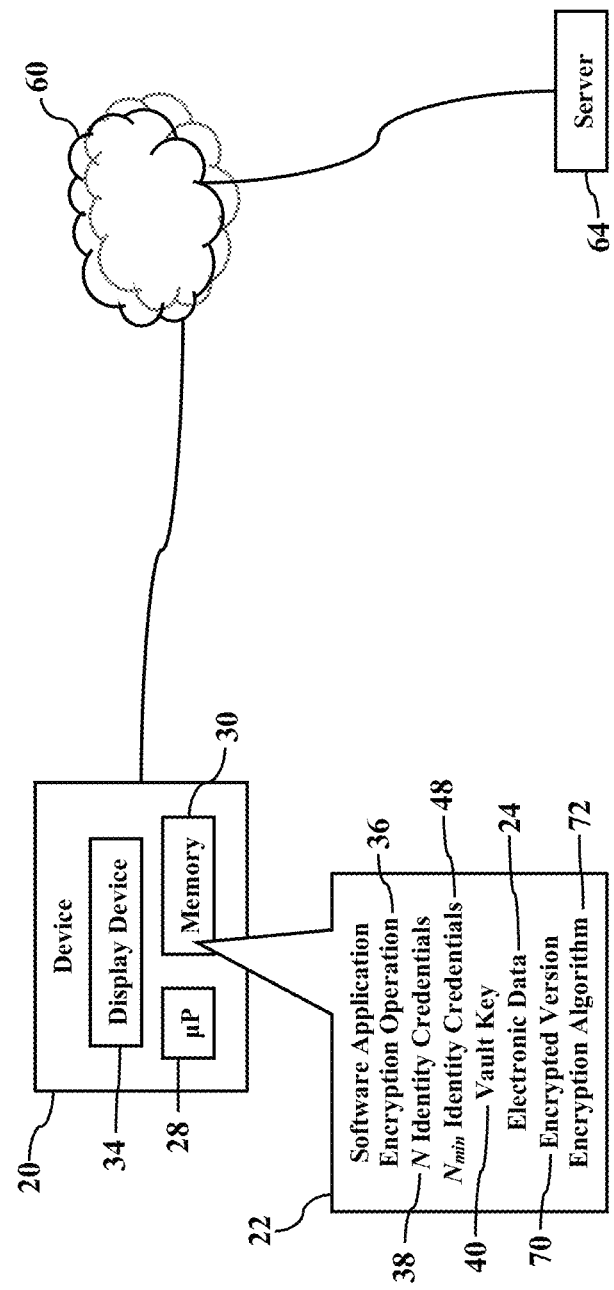
FIGS. 14-15 are more detailed illustration of an operating environment, according to exemplary embodiments.
Figure 15:
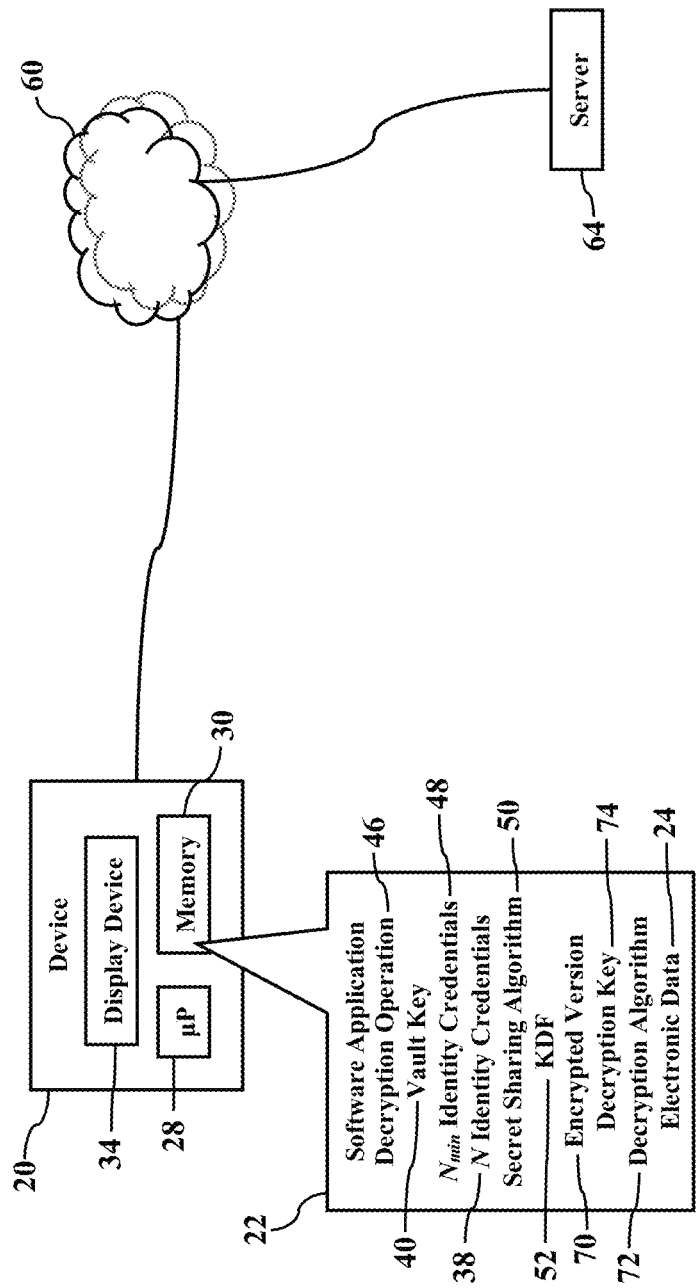

FIGS. 14-15 are more detailed illustration of an operating environment, according to exemplary embodiments. FIG. 14 illustrates the device 20 communicating via the communications network 60 with the remote server 64. The device 20 has the hardware processor 28 (e.g., "μP"), application specific integrated circuit (ASIC), or other component that executes the software application 22 stored in its local, solid-state memory device 30. The device 20 has a network interface (not shown for simplicity) to the communications network 60, thus allowing two-way, bidirectional communication. The software application 22 includes instructions, code, and/or programs that cause the device 20 to perform operations, such as receiving tactile inputs (perhaps via the touch screen display device 34) representing a selection of the encryption operation 36, entry or selection of the N multiple identity credentials 38, and entry or selection of the minimum required number $N_{min}$ 48 of the identity credentials 38. The software application 22 causes the hardware processor 28 to generate the vault key 40 and to receive one or more selections representing a file, memory, and/or network location of the electronic data 24 to be encrypted. After the electronic data 24 is identified, the software application 22 generates the encrypted version 70 by encrypting the electronic data 24 using the vault key 40 as an encryption parameter to the encryption algorithm 72. The software application 22 also causes the device 20 to locally store the encrypted version 70 of the electronic data 24 in the solid-state memory device 30.

FIG. 15 illustrates decryption. When the hardware processor 28 executes the software application 22, the user of the device 20 may tactilely select or request the decryption operation 46. The software application 22 may optionally prompt the user to select or input the vault key 40. The user may also be prompted for password inputs. The software application 22 may thus present a series or sequence of prompts to input the minimum number $N_{min}$ 48 of the identity credentials 38 that were previously used to create the vault key 40. Once the software application 22 receives the $N_{min}$ 48 of the identity credentials 38, the software application 22 may prompt the user to select the file/memory/network location of the encrypted version 70 (such as the local hardware memory device 30 or the remote server 64). The encrypted version 70 may also be obtained by scanning a physical representation (as this disclosure above explained). After the user identifies the encrypted version 70, the software application 22 causes or instructs the smartphone 26 to recreate all the N identity credentials 38 using the secret sharing algorithm 50. Once all the N identity credentials 38 (N passwords/passphrases 44) have been re-created, the software application 22 calls or invokes the key derivation function ("KDF") 52 to derive the decryption key 74. The software application 22 may then call the decryption algorithm 72 that uses the decryption key 74 as a decryption parameter to generate a decrypted version from the encrypted version 70. In other words, if the minimum number $N_{min}$ 48 of the N identity credentials 38 are correctly entered, the decryption key 74 is correctly created and will successfully decrypt the encrypted version 70, thus reproducing the electronic data 24.

Exemplary embodiments may be applied regardless of networking environment. Exemplary embodiments may be easily adapted to stationary or mobile devices having cellular, wireless local area networking capability (such as WI-FI©), low power, near field, and/or BLUETOOTH© capability. Exemplary embodiments may be applied to any devices utilizing any portion of the electromagnetic spectrum and any signaling standard (such as the radio spectrum and IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When any device or server communicates via the communications network 60, the device or server may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 16:
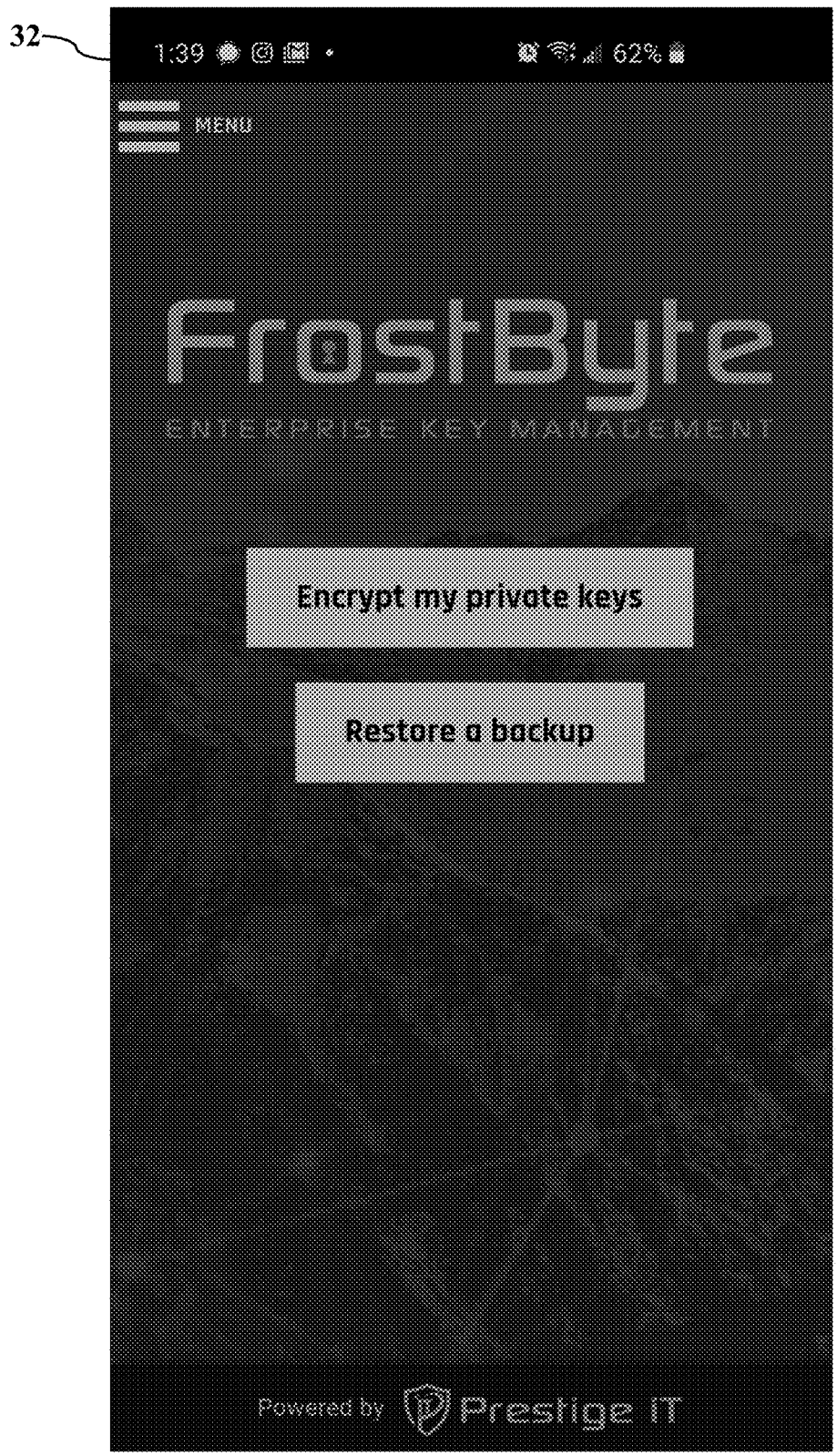
Figure 17:
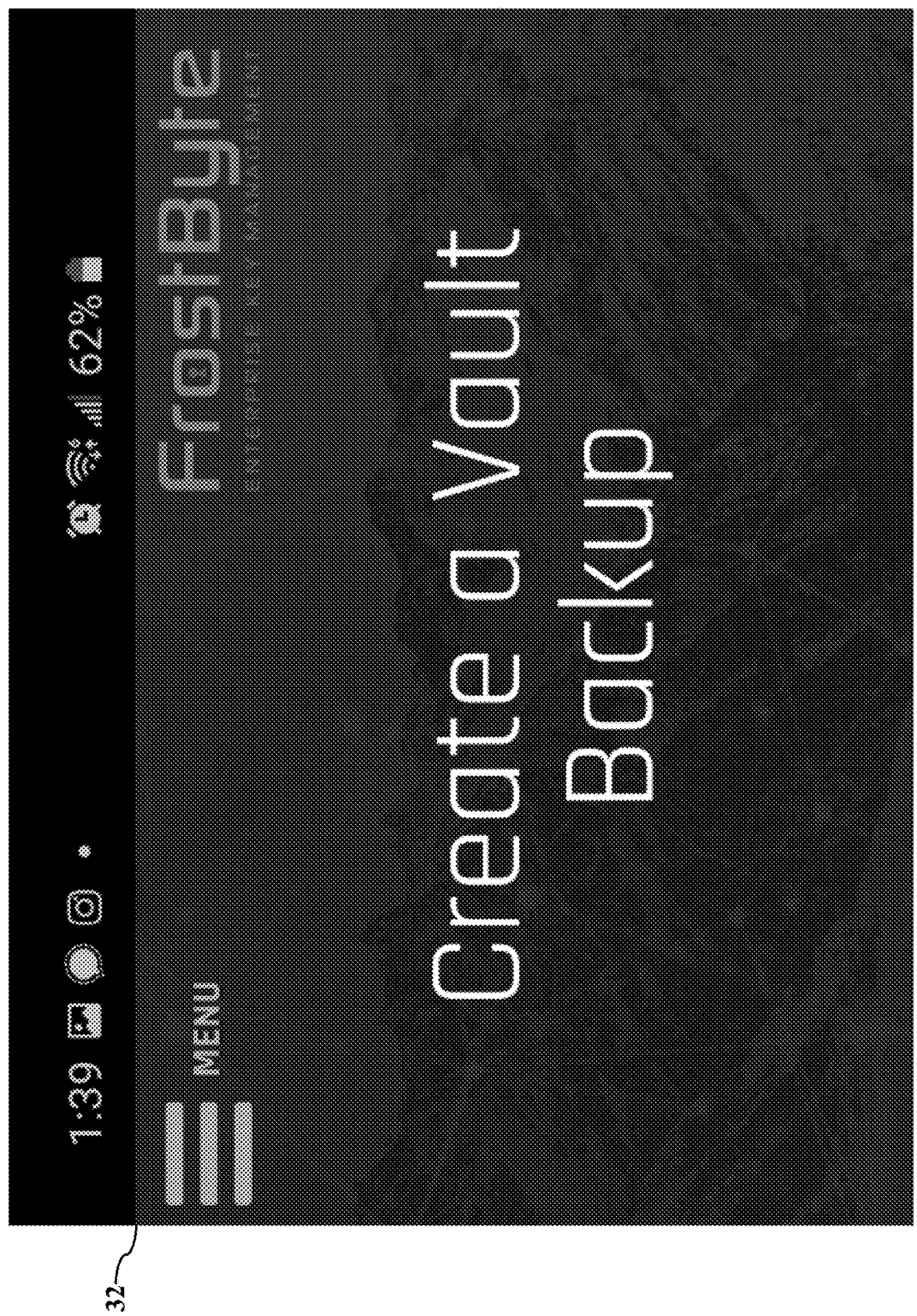
Figure 18:
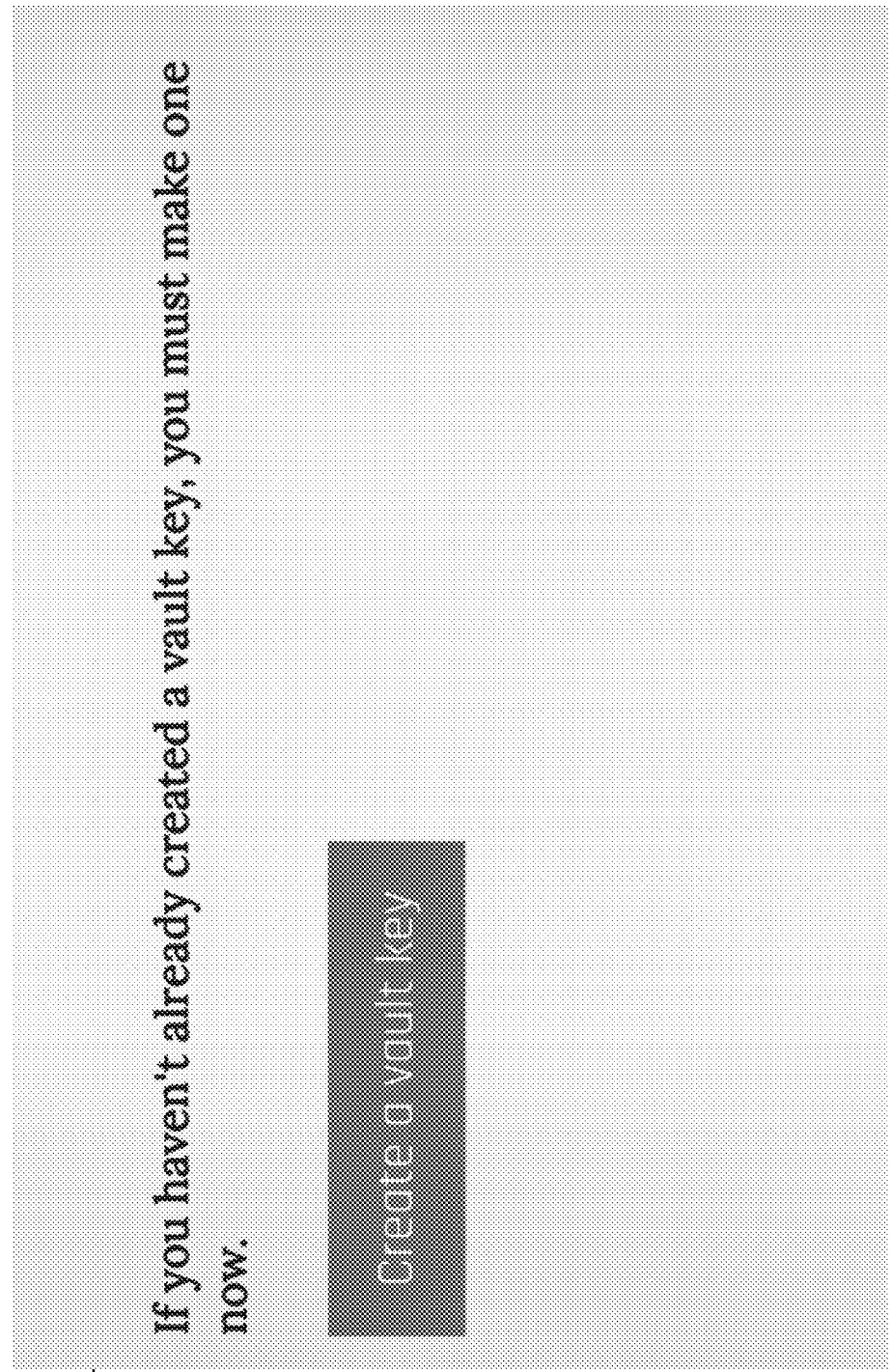
Figure 19:
Figure 20:
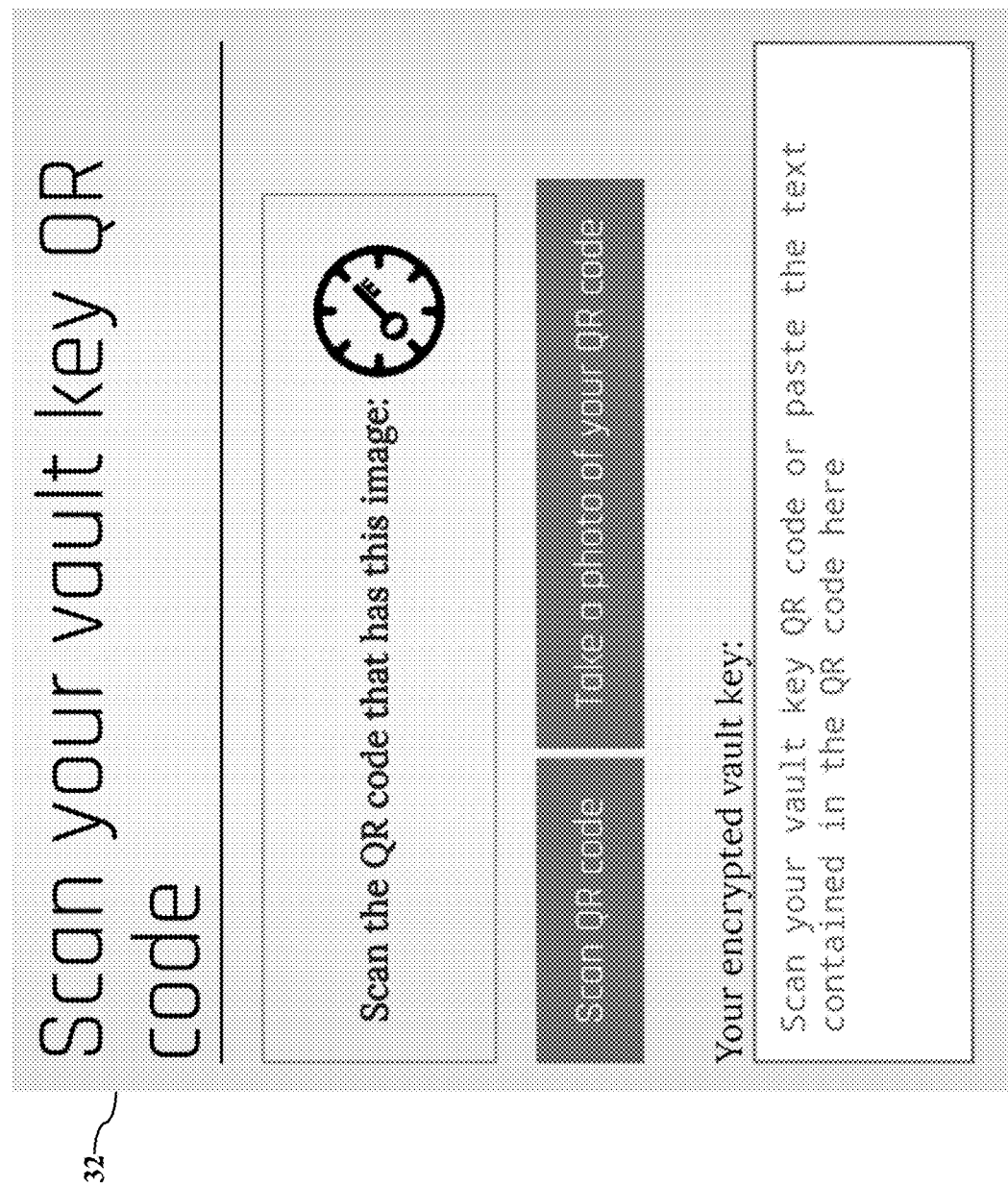
Figure 22:
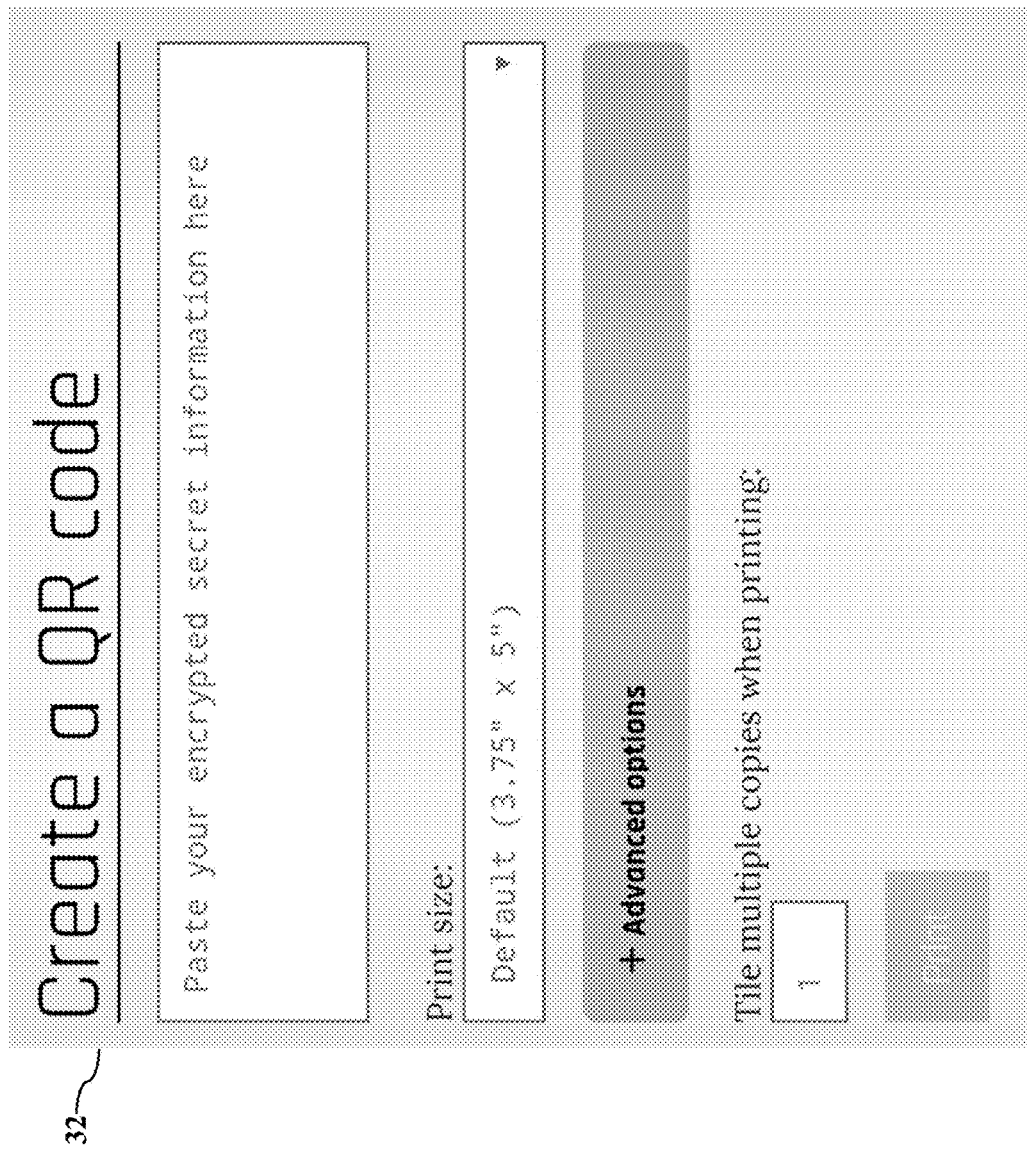

FIGS. 16-22 are screenshots illustrating the encryption operation 36, according to exemplary embodiments. The screenshots are displayed (such as by the device/smartphone 20/26) when executing the software application 22 (as explained with reference to FIG. 1). FIG. 16, for example, illustrates the graphical user interface 32 presenting an initial or welcome screenshot presenting menu selections for i) encrypting private keys or ii) restoring a backup. FIG. 17 illustrates the graphical user interface 32 presenting an option to create a "vault" backup (e.g., storing the encrypted version 70 of the user's selected electronic data 24). However, the software application 22 may first visually prompt the user to first create the vault key 40, as FIG. 18 illustrates. After the user tactilely selects a graphical control for creating the vault key 10, FIG. 19 illustrates a prompt and a data field for typing/entering the user's secret information (i.e., the electronic data 24) to archive or back up. While the user may be given controls to navigate to any network location and to select any electronic data 24, FIG. 19 illustrates a simple example that prompts for the identity credentials 38. The user, in other words, desires to back up the identity credentials 38. FIG. 20 illustrates the screenshot having optional graphical controls for inputting/scanning the vault key 40 that may have been previously generated. Recall that the vault key 40 may have been previously created as the QR code 54 and/or the barcode 56 (as explained with reference to FIG. 4), so the vault key 40 may be optically or digitally scanned/imaged as a camera input. The graphical user interface 32 may also have a data field for manually entering/typing the alphanumeric text 58 representing the vault key 40 (as also explained with reference to FIG. 4). FIG. 21 illustrates the graphical user interface 32 having password data fields for manually entering/typing the $N_{min}$ 48 of the identity credentials 38 that are required by the vault key 40. After the $N_{min}$ 48 of the identity credentials 38 are entered, the user selects an encrypt graphical control that initiates/starts/causes the encryption operation 38 to encrypt the user's secret information (i.e., the electronic data 24) and to generate the encrypted version 70. An additional graphical control may hide or clear any display of the identity credentials 38 to ensure confidentiality and security. FIG. 22 illustrates the creation of the QR code 76 representing the encrypted version 70. Recall that the encrypted version 70 may be represented as the QR code 76 and physically output (as explained with reference to FIG. 6). The user may be prompted to enter the alphanumeric representation 80 of the encrypted version 70 into a data field. Alternatively, the graphical user interface 32 may have graphical controls to navigate to any network location and to select encrypted version 70. After the software application 22 generates the QR code 76 representing the encrypted version 70, the QR code 76 may be printed to paper according to a selectable size and number of copies.

Figure 23:
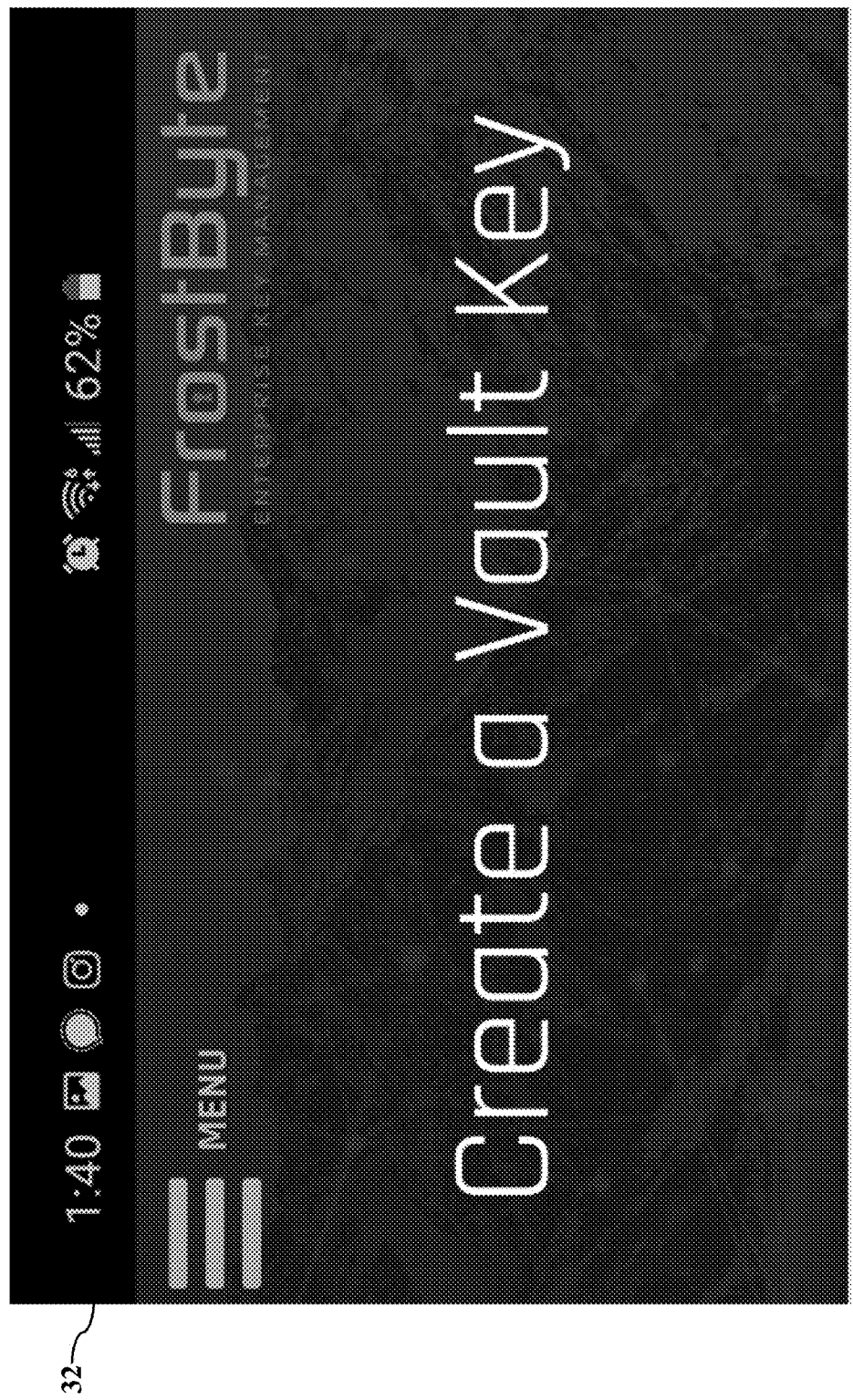
Figure 25:
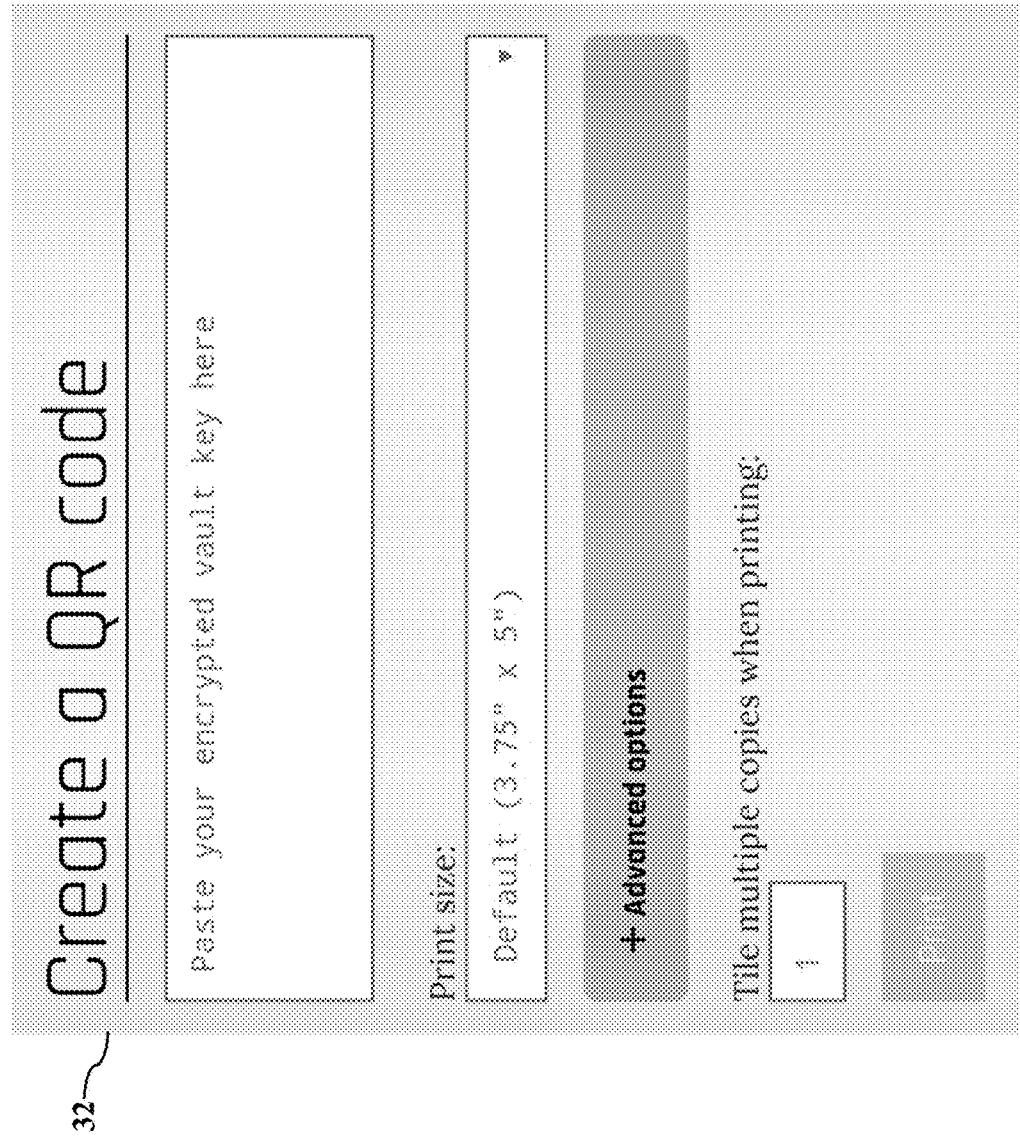
Figure 26:
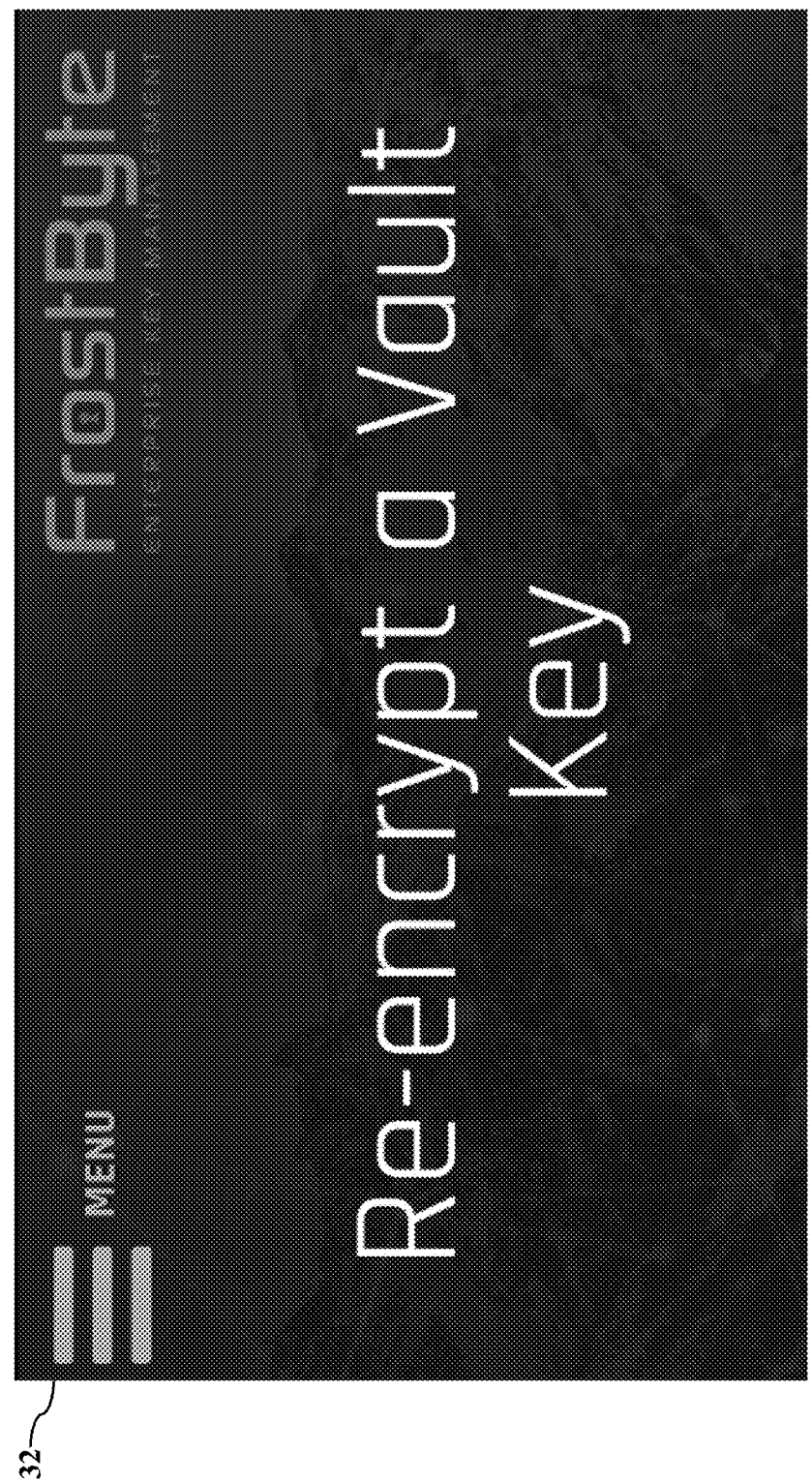

FIGS. 23-25 are screenshots illustrating the creation of the vault key 40, according to exemplary embodiments. As FIG. 24 illustrates, the graphical user interface 32 prompts the user to input the total number N of the identity credentials 38 that will be entered, plus the $N_{min}$ 48 of the identity credentials 38 that are required by the vault key 40. The software application 22 generates the password data fields for entering the N identity credentials 38. After the user enters the N identity credentials 38, the user selects a creation control that causes the software application 22 to create the vault key 40. FIG. 25 illustrates the physical printing of the vault key 40 as the QR code 54 (as explained with reference to FIG. 4), with the user having selectable controls/options for selecting the size and number of copies.

Figure 27:
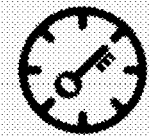
Figure 28:
Figure 31:
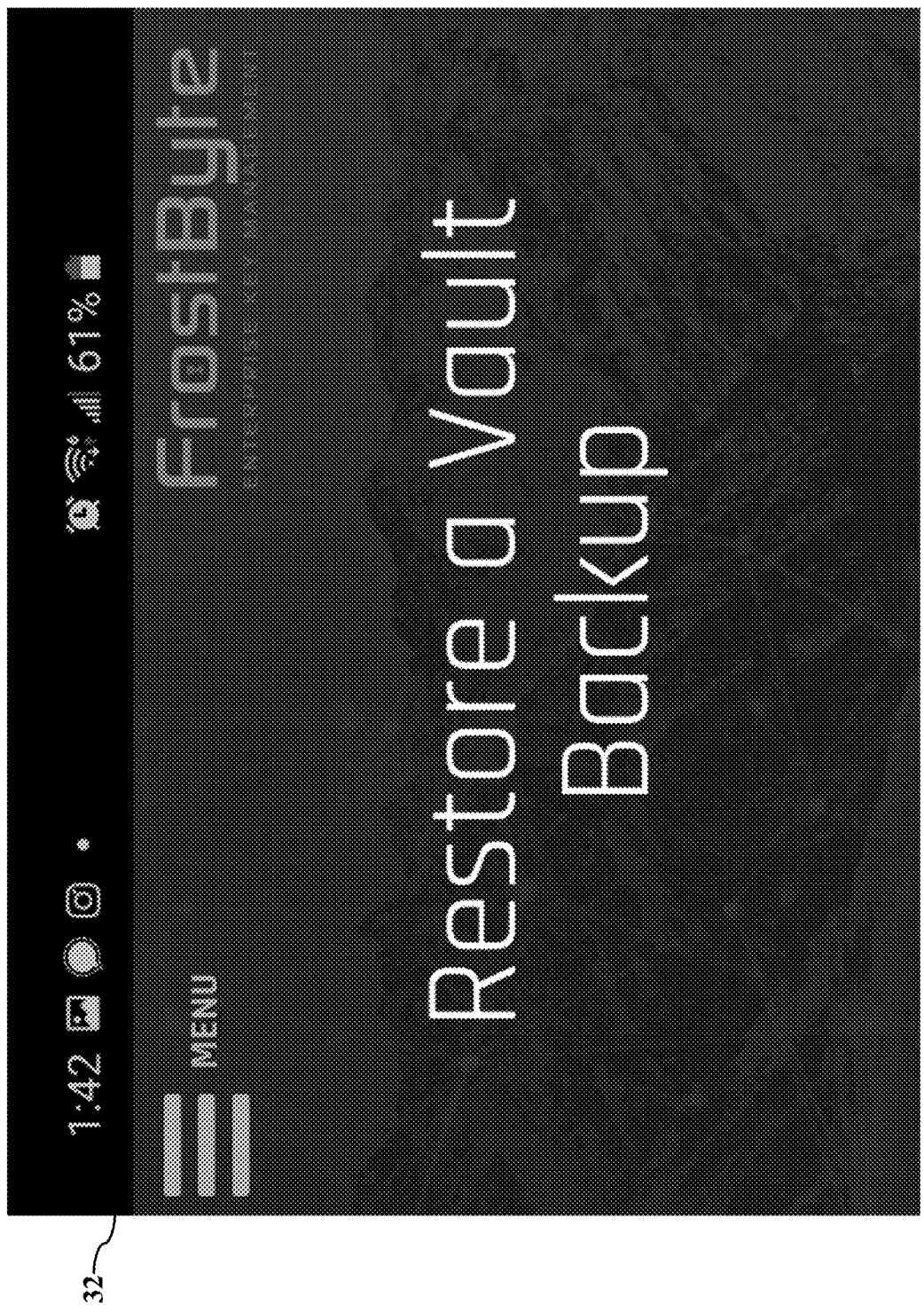
FIGS. 31-34 are screenshots illustrating a decryption operation, according to exemplary embodiments.

FIGS. 26-30 are screenshots illustrating a re-encryption of the vault key 40, according to exemplary embodiments. As FIG. 27 illustrates, the graphical user interface 32 prompts the user to input the vault key 40 previously/historically created (e.g., scanning the QR code 54 and/or the barcode 56 and/or entering/typing the alphanumeric text 58, as also explained with reference to FIG. 4). FIG. 28 illustrates prompts for entering the "old" identity credentials 38 that are required by the previous/historical/old vault key 40. FIG. 29 illustrates the graphical user interface 32 prompting the user to input the "new" N identity credentials 38 for the newly generated vault key 40, plus the $N_{min}$ 48 of the identity credentials 38 that are required by the new vault key 40. The graphical user interface 32 presents the password data fields for entering the N identity credentials 38. After the user enters the N identity credentials 38, the user selects a re-encryption control that causes the software application 22 to re-encrypt the "old" vault key 40 as a "new" vault key 40. FIG. 30 illustrates the physical printing of the newly re-encrypted vault key 40 as the QR code 54 (as explained with reference to FIG. 4), with the user having selectable controls/options for selecting the size and number of copies.

Figure 32:
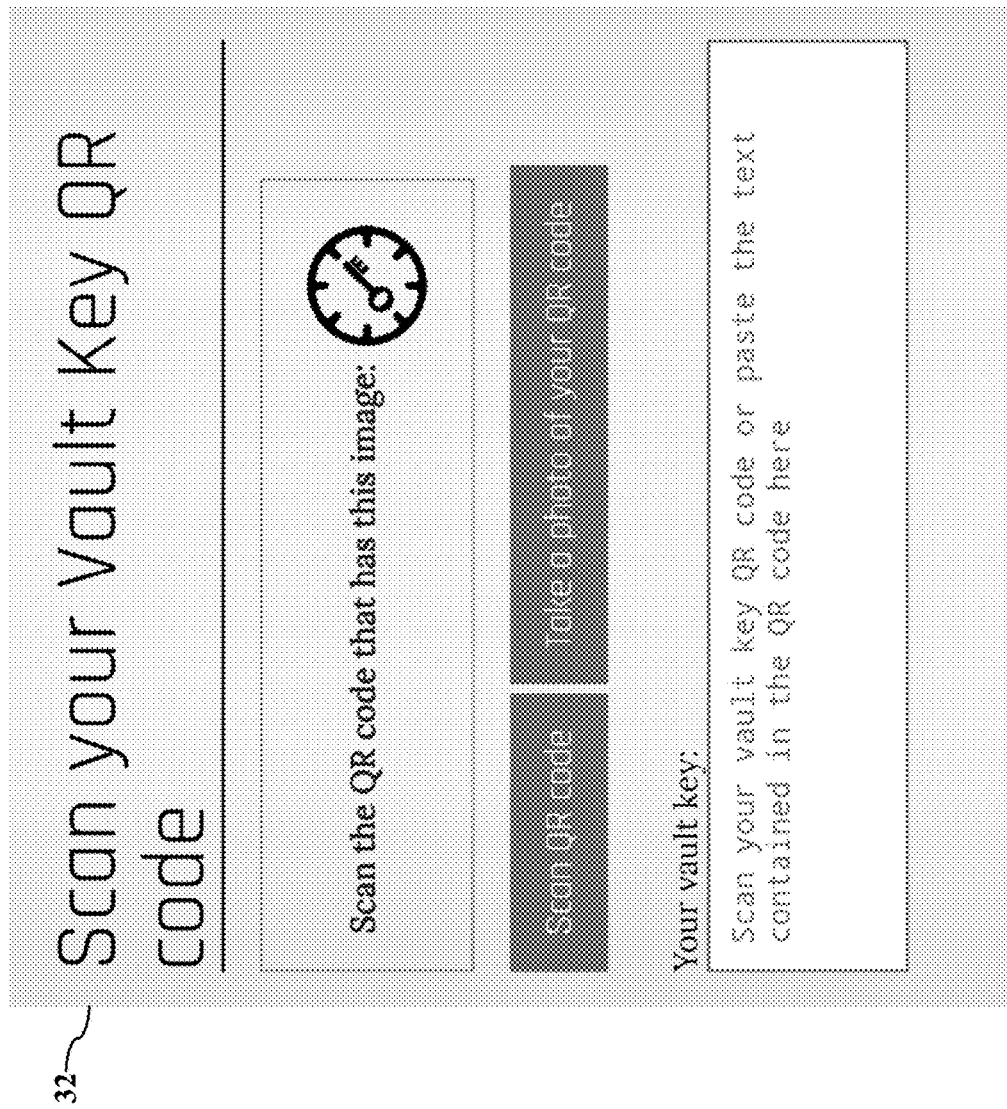
Figure 33:
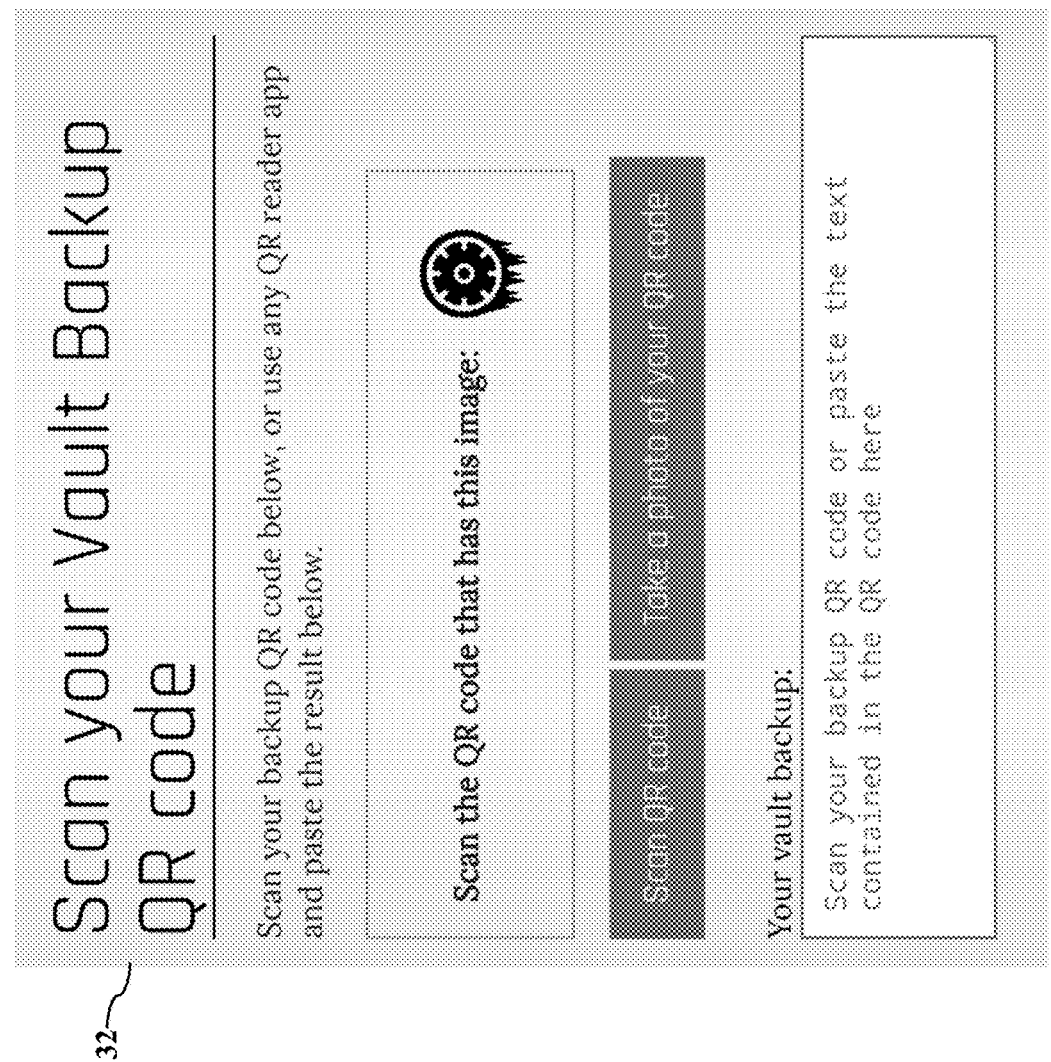
Figure 34:
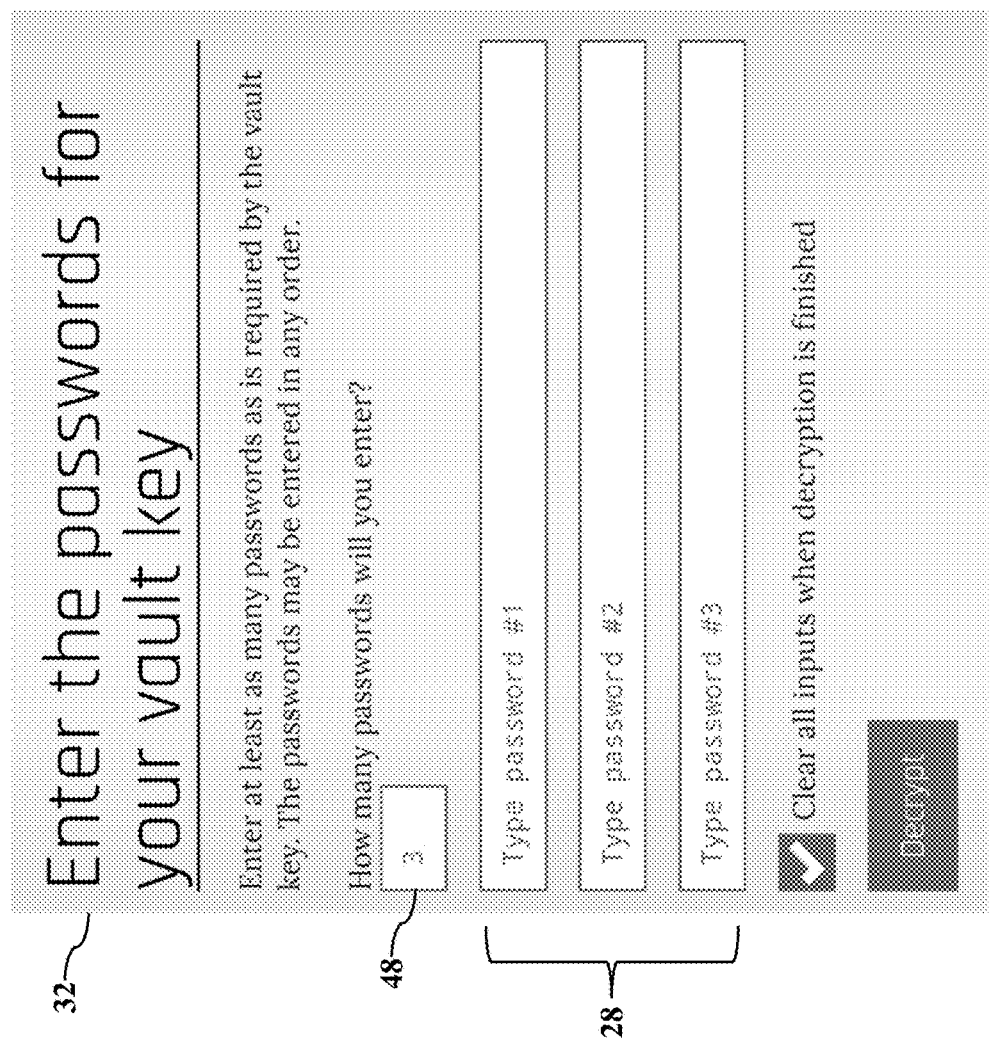

FIGS. 31-34 are screenshots illustrating the decryption operation 46, according to exemplary embodiments. As FIG. 32 illustrates, the graphical user interface 32 prompts the user to input the vault key 40 that is associated with the encrypted version 70 (e.g., scanning the QR code 54 and/or the barcode 56 and/or entering/typing the alphanumeric text 58, as explained with reference to FIG. 4). FIG. 33 illustrates prompts to scan/photo/enter the QR code 76 representing the encrypted version 70 (as explained with reference to FIG. 6). FIG. 34 illustrates prompts to enter the $N_{min}$ 48 of the identity credentials 38 that are required by the vault key 40. After the user enters the $N_{min}$ 48 of the identity credentials 38, the user selects a decryption control that causes the software application 22 to retrieve the encrypted version 70 and perform the decryption operation 46.

Figure 35:
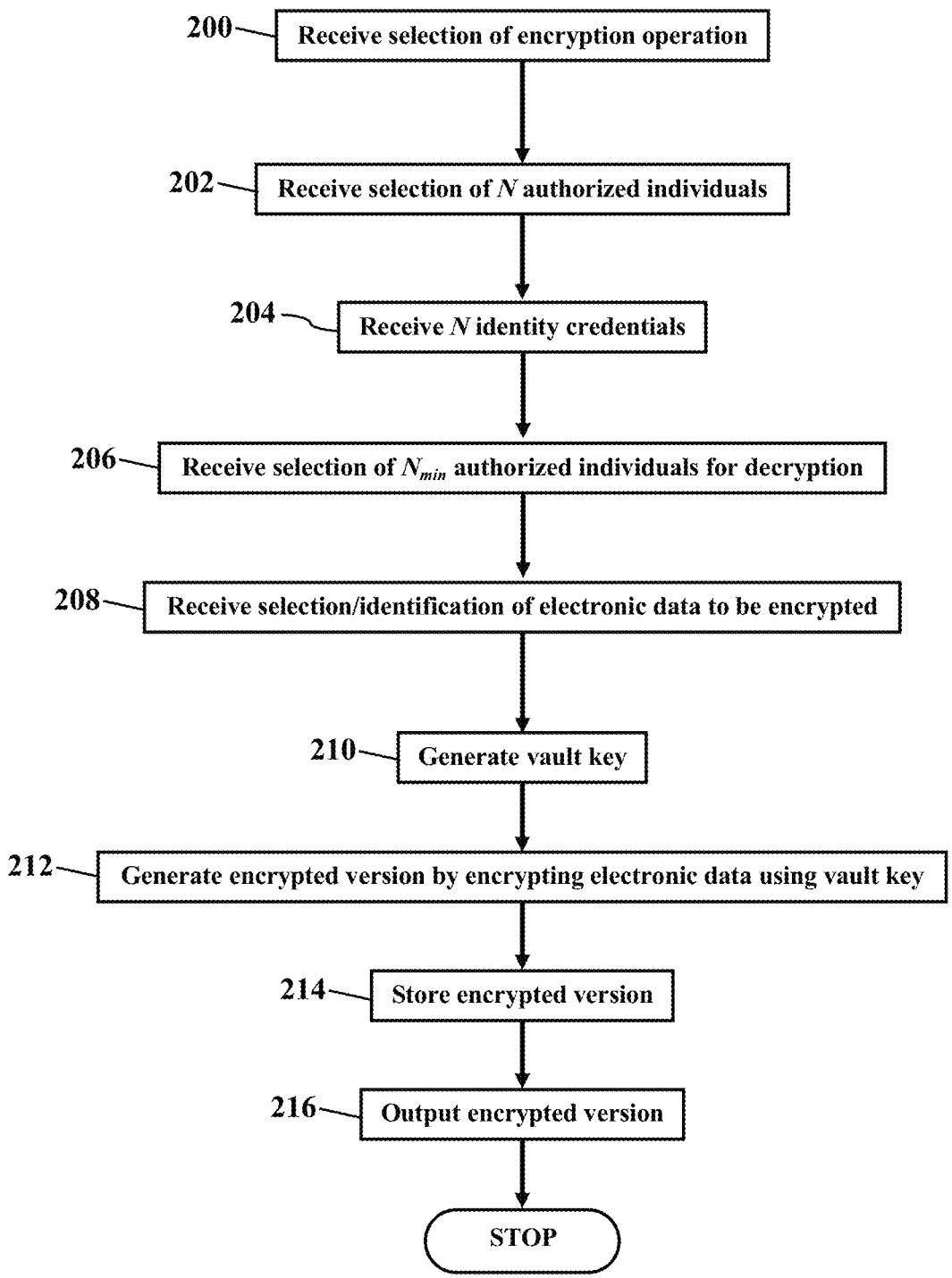
FIG. 35 is a flowchart illustrating a method or algorithm for encryption of the electronic data, according to exemplary embodiments.

FIG. 35 is a flowchart illustrating a method or algorithm for encryption of the electronic data 24, according to exemplary embodiments. A selection of the encryption operation 36 is received (Block 200). A selection of the N number of the authorized individuals 42 is received (Block 202) and their respective identity credentials 38 are received (Block 204). A selection of the minimum required number $N_{min}$ 48 of the identity credentials 38 for decryption is also received (Block 206). A selection of the electronic data 24 to be encrypted is received (Block 208). The vault key 40 is generated (Block 210). The encrypted version 70 of the electronic data 24 is generated by encrypting the electronic data 24 using the vault key 40 as an encryption parameter to the encryption algorithm 72 (Block 212). The encrypted version 70 is locally and/or remotely stored (Block 214). The encrypted version 70 may also be physically output for offline storage (Block 216).

Figure 36:
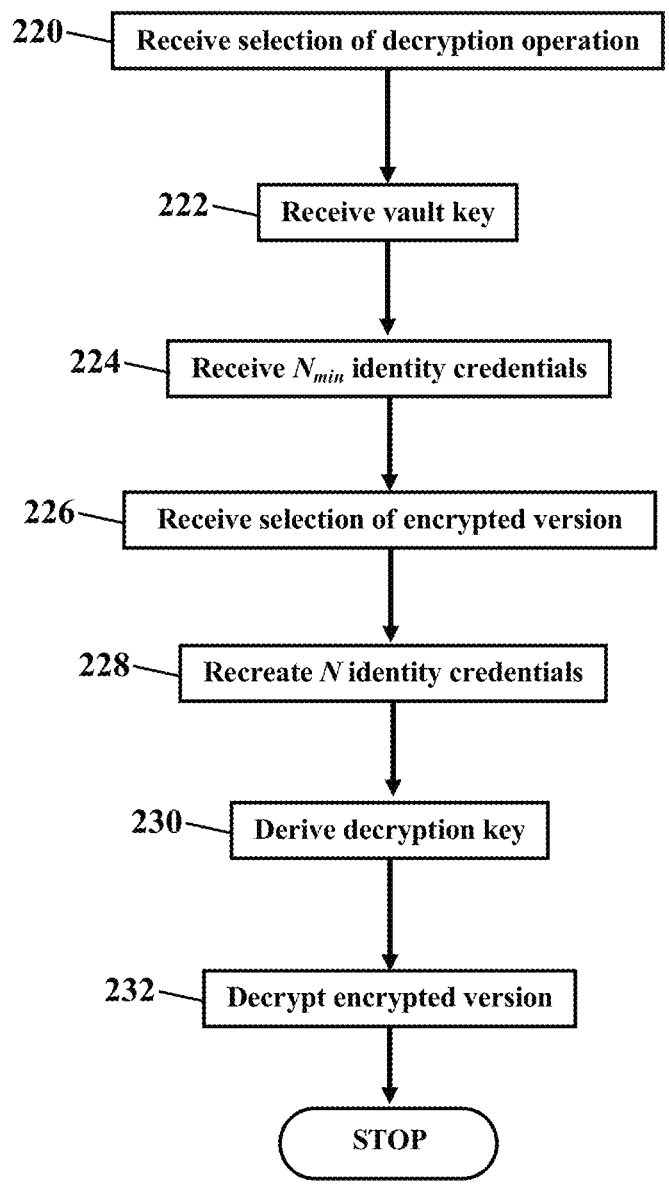
FIG. 36 is a flowchart illustrating a method or algorithm for decryption of encrypted data, according to exemplary embodiments.

FIG. 36 is a flowchart illustrating a method or algorithm for decryption of the encrypted version 70, according to exemplary embodiments. A selection of the decryption operation 46 is received (Block 220). An entry, input, or scan of the vault key 40 is received (Block 222). Prompts are presented to input/receive the minimum number $N_{min}$ 48 of the identity credentials 38 (Block 224) that were previously used to create the vault key 40. A selection of the decrypted version 70 to be decrypted is received (Block 226). The N identity credentials 38 are recreated using the minimum number $N_{min}$ 48 of the identity credentials 38 (Block 228). The decryption key 74 is derived using the N identity credentials 38 (Block 230) and used as a decryption parameter to decrypt the encrypted version 70 (Block 232).

Figure 37:
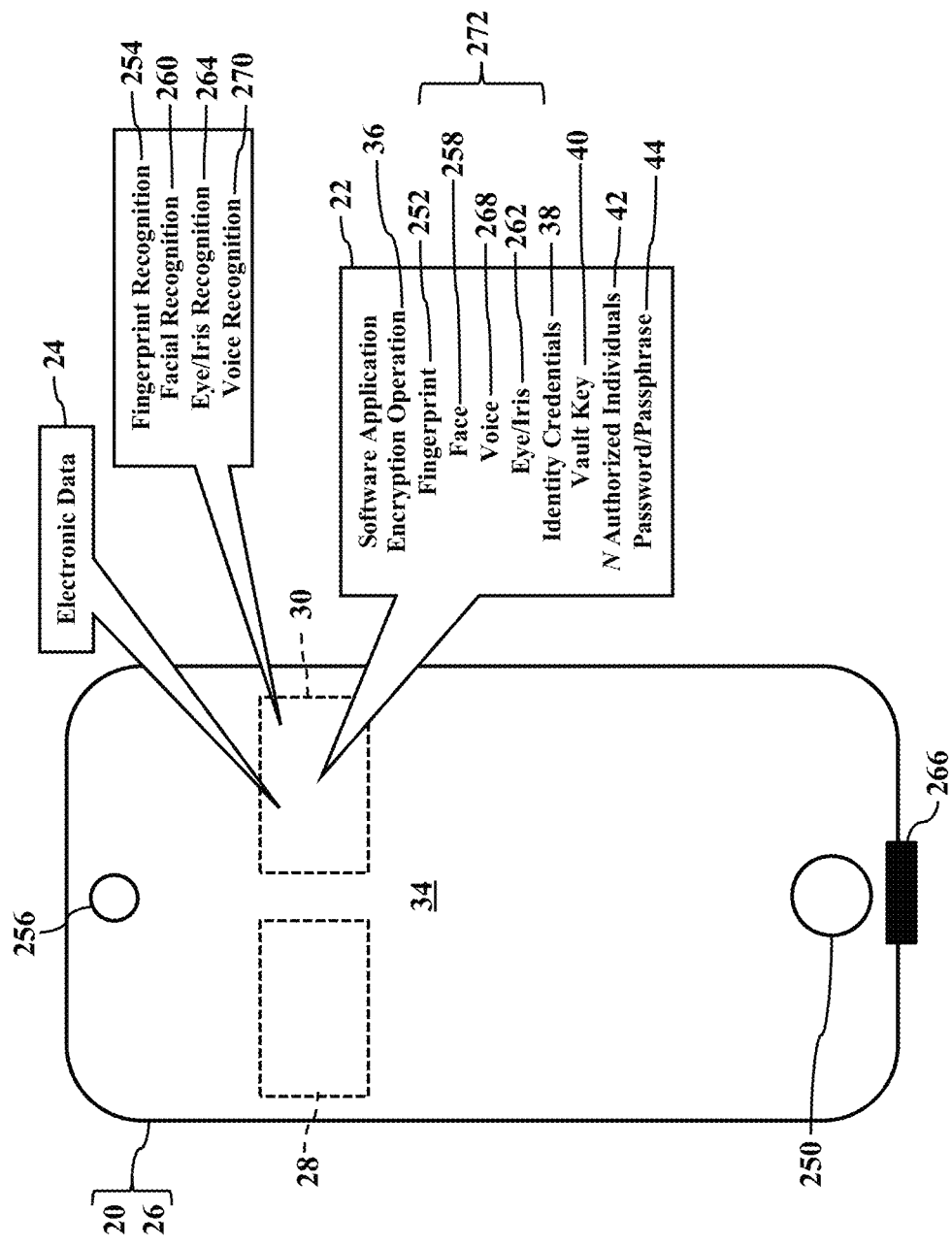
FIG. 37 illustrates biometric encryption, according to exemplary embodiments.

FIG. 37 illustrates biometric encryption, according to exemplary embodiments. The device 20 (e.g., the smartphone 26) may have biometric capabilities that may also be used to authenticate and/or to enhance the encryption operation 36. As the reader may understand, the smartphone 26 may have a fingerprint sensor 250. The user of the smartphone 26 places her finger on or near the fingerprint sensor 250, and the fingerprint sensor 250 generates an electronic representation of the user's fingerprint 252. The fingerprint sensor 250 may use any fingerprint recognition scheme (such as digital imaging and/or capacitive sensing) to create the electronic representation of the user's fingerprint 252. A fingerprint recognition system 254 may then use the electronic representation of the user's fingerprint 252 to authenticate the user. If the electronic representation of the user's fingerprint 252 exactly or substantially matches a stored, enrolled reference image, data value(s), or historical representation, then the user may authenticate, unlock, and access/use the smartphone 26.

The smartphone 26 may have additional biometric capabilities. A front-facing camera 256 may capture an electronic representation of the user's face 258 (e.g., infrared facial map, image, and/or data). A facial recognition system 260 may then use the electronic representation of the user's face 258 to authenticate the user. If the electronic representation of the user's face 258 exactly or substantially matches a stored, enrolled reference image, map, data value(s), or historical representation, then the user may authenticate, unlock, and access/use the smartphone 26. The front-facing camera 256 may additionally or alternatively capture an electronic representation of the user's eye/iris 262, and an eye/iris recognition system 264 may then use the electronic representation to compare to a stored, enrolled reference image, map, data value(s), or historical representation. A microphone 266 may capture an electronic representation of the user's voice 268, and a recognition system 270 may then use the electronic representation to compare to a stored, enrolled reference image, map, data value(s), or historical representation. If the electronic representation of the user's voice 268 exactly or substantially matches a stored, enrolled reference recording, audio data value(s), or historical audio representation, then the user may authenticate, unlock, and access/use the smartphone 26.

The software application 22 may incorporate these biometric capabilities. For example, when the user selects the encryption operation 36, the software application 22 may prompt for the multiple users' identity credentials 38 (such as explained with reference to FIGS. 1-3). The software application 22, however, may be configured to require any user's respective password/passphrase 44 and/or her/his biometric input 272. That is, the user may be required to input both her password/passphrase 44 and her biometric(s) (e.g., her fingerprint 252, her face 258, and/or her voice 268). Some of the authorized individuals may be required to input multiple identity credentials 38 (e.g., her corresponding password/passphrase 44 and her biometric fingerprint 252, face 258, and/or voice 268), while other users may only need to submit a single identity credential 38 (such as their corresponding password/passphrase 44 or biometric face 258). Indeed, the software application 22 may be configured to require specific authorized individuals to input two or more of the identity credentials 38, while other specific individuals may need only to input their single identity credential 38. A different configuration may be permitted to randomly select which of the authorized individuals undergoes multiple identity credentials 38 or a single identity credential 38. The software application 22 may also allow any user to elect the number of the identity credentials 38 required to be input.

The software application 22 orchestrates encryption. Once all the multiple N identity credentials 38 (e.g., the passwords/passphrases 44 and/or the biometric inputs 272) have been input/entered, the software application 22 causes or instructs the smartphone 26 to create the cryptographic vault key 40 based on the N passwords/passphrases 44 and/or the N biometric inputs 272 and/or the minimum number $N_{min}$ 48. The software application 22, for example, may use the secret sharing algorithm 50 to shard the passwords/passphrases 44 and/or the biometric inputs 272, according to the minimum number $N_{min}$ 48, to generate the vault key 40. The software application 22 may also use the key derivation function 52 (such as the scrypt algorithm) to derive the encryption key from any one or more of the passwords/passphrases 44, the biometric inputs 272, and/or the vault key 40. Once the vault key 40 is created, an electronic representation of the vault key 40 may be stored in the hardware memory device 30 for usage and for retrieval (as this disclosure above explains). The software application 22 may also use passwords/passphrases 44, the biometric inputs 272, and/or the vault key 40 to perform the encryption operation 36 and the decryption operation 46 (as this disclosure above explains).

Exemplary embodiments may thus use biometrics for generating the cryptographic keys. Any authorized individual's password/passphrase 44 and/or their biometric input(s) 272 (e.g., the fingerprint 252, the face 258, and/or the voice 268) may be used as part of a private key to generate a public key (or to generate sets of private-public key pairs) for purposes of encrypting the sensitive electronic data 24. The private-public key pairs (generated from the passwords/passphrases 44, the biometric inputs 272, and/or the vault key 40) may then also be used to decrypt the encrypted version 70. As such, those private-public key pairs (or those resultants which are generated from the encryption of the passwords/passphrases 44, the biometric inputs 272, and/or the vault key 40) may be considered as "Access Keys" as well as a form of data vault.

Biometrics-based security enhances the encryption operation 36 and the decryption operation 46. The digitization of an authorized individual's biometrics, perhaps coupled with their corresponding password/passphrase 44, may be used to create Access Keys that provide greater assurance in protecting the sensitive electronic data 24. It is possible to generate a unique private key using biometrics algorithms. Once a private key has been generated from the passwords/passphrases 44, the biometric inputs 272, and/or the vault key 40, a public key can be generated randomly from the private key using SHA-256. To enhance security, a Hierarchical Deterministic Wallet can use private-public key pairs to generate new associated private-public key pairs using SHA-256. Biometric identification/authentication may thus enhance the encryption operation 36 and the decryption operation 46. The software application 22 may thus use any authorized individual's password/passphrase 44 and/or biometric input 272 in order to enhance the encryption.

Figure 38:
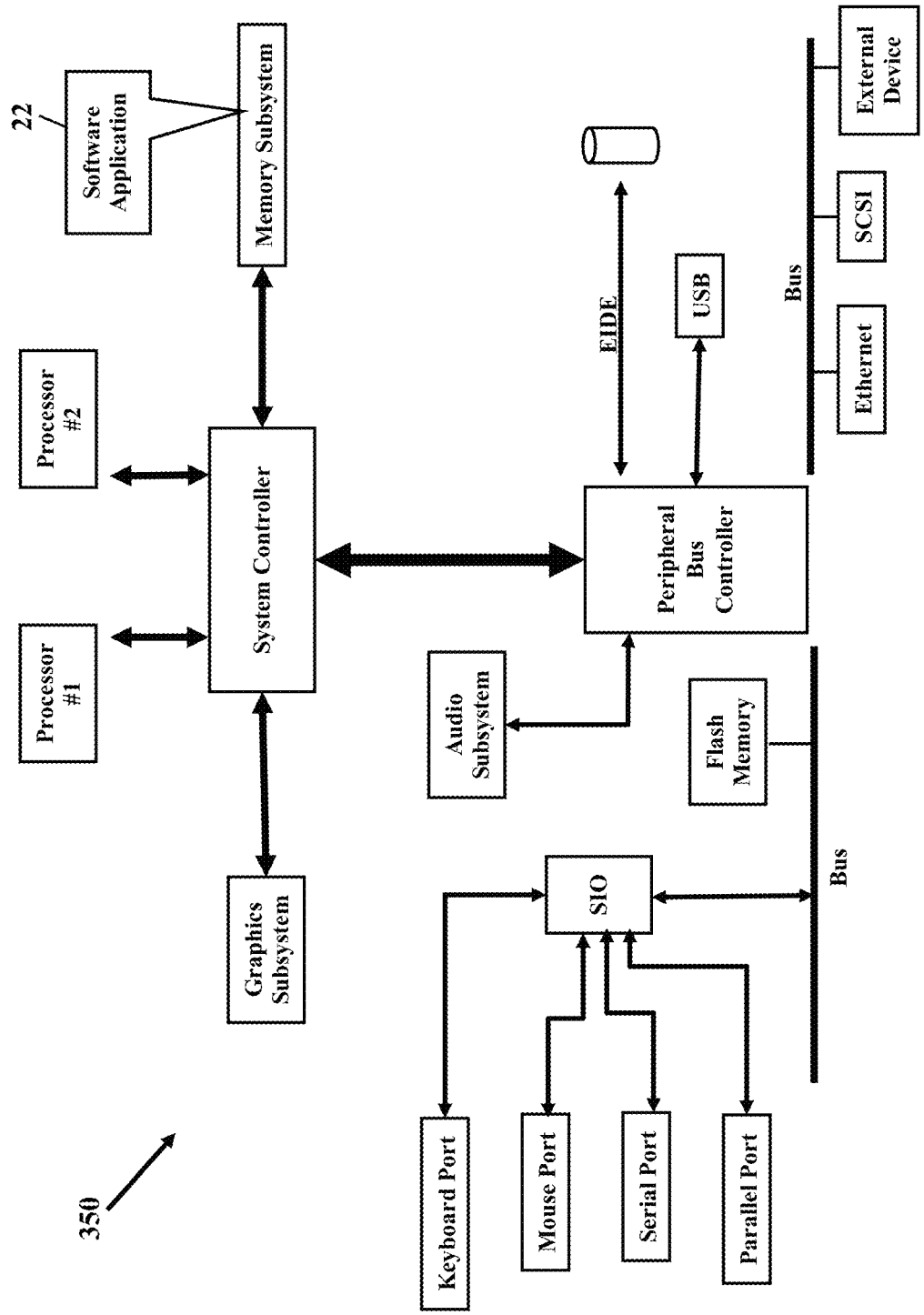
FIGS. 38-39 illustrate additional operating environments, according to exemplary embodiments.

FIG. 38 is a schematic illustrating still more exemplary embodiments. FIG. 38 is a more detailed diagram illustrating a processor-controlled device 350. As earlier paragraphs explained, the software application 22 may partially or entirely operate in any mobile or stationary processor-controlled device. FIG. 38, then, illustrates the software application 22 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 39:
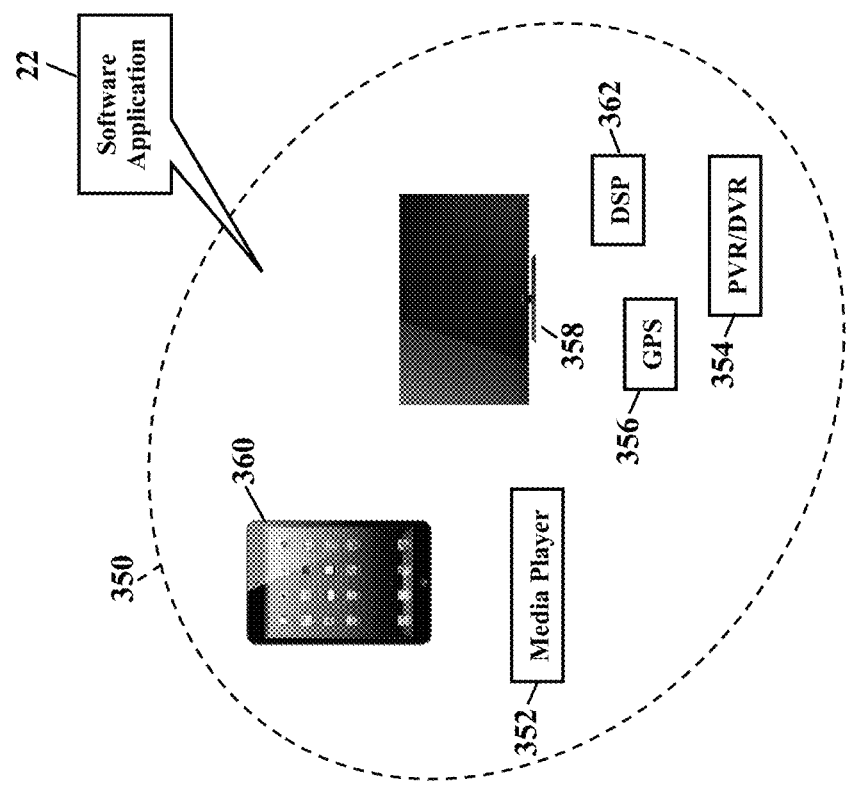

FIG. 39 depicts other possible operating environments for additional aspects of the exemplary embodiments. FIG. 39 illustrates the software application 22 operating within various other processor-controlled devices 350. FIG. 39, for example, illustrates that the software application 22 may entirely or partially operate within a set-top box ("STB") or other media player (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, cameras, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode"

GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH©, and any other.

Exemplary embodiments improve functioning of the processor-controlled device 350. When the electronic data 24 (stored by the processor-controlled device 350, such as the smartphone 26) is password/passphrase protected/encrypted, the electronic data 24 is essentially inaccessible unless the correct password/passphrase is known and entered. However, as recent news illustrates, even a simple 4-6-character password/passphrase is extremely difficult to remember and/or to recover. Indeed, philosophical debates are ongoing as to whether manufacturers should be obligated to "break" password/passphrase security schemes. Exemplary embodiments resolve these philosophical privacy debates by designating multiple combinations or ones of the identity credentials 38 for access and/or decryption. The N authorized individuals 42, for example, may have their corresponding identity credentials 38 registered, and any combination of the $N_n n$ identity credentials 38 may unlock and/or decrypt. The processor-controlled device 350 (such as the smartphone 26) may thus be programmed for great cryptographic security but with greatly improved access for decryption.

Exemplary embodiments may be physically embodied on or in a computer-readable non-transitory storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for encryption and decryption, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method executed by a device that encrypts an electronic data, the method comprising:
   receiving, by the device, passwords associated with users, each password of the passwords associated with a corresponding user of the users;
   receiving, by the device, a first selection representing a minimum number of the passwords;
   receiving, by the device, a second selection of the electronic data to encrypt;
   generating, by the device, an encryption vault key using only the passwords as inputs to a key derivation function;
   generating, by the device, an encrypted version of the electronic data represented by the second selection by encrypting the electronic data using the encryption vault key generated using only the passwords;
   generating, by the device, vault key secret shares by inputting the encryption vault key, the passwords, and the minimum number to a secret sharing algorithm;
   receiving, by the device, a request to change at least one of the passwords;
   in response to the receiving of the request to change the at least one of the passwords, receiving, by the device, the minimum number of the vault key secret shares;
   creating, by the device, a recreated version of the encryption vault key using the minimum number of the vault key secret shares;
   receiving, by the device, new passwords associated with new users; and
   generating, by the device, new vault key secret shares of the recreated version of the encryption vault key by inputting the recreated version of the encryption vault key, the new passwords, and the minimum number to the secret sharing algorithm;
   wherein the at least one of the passwords is changed without decrypting the encrypted version of the electronic data.

2. The method of claim 1, further comprising receiving inputs representing the passwords associated with the users.

3. The method of claim 1, further comprising prompting to enter the passwords.

4. The method of claim 1, further comprising receiving an output selection to output a physical version of the encryption vault key.

5. The method of claim 1, further comprising receiving an output selection to output a physical version of the encrypted version of the electronic data.

6. The method of claim 1, further comprising storing the encryption vault key.

7. A system encrypting an electronic data, comprising:
   a hardware processor; and
   a memory device storing instructions that when executed by the hardware processor perform operations, the operations comprising:
   receiving a first selection via a graphical user interface of a number of authorized individuals required for an encryption of the electronic data;
   receiving passwords entered by the authorized individuals via the graphical user interface, each password of the passwords entered by a corresponding individual of the authorized individuals;
   receiving a second selection via the graphical user interface representing a minimum number of the passwords that are required for a decryption operation;
   generating a cryptographic vault key using only the passwords and the minimum number of the passwords as inputs to a key derivation function;
   generating an encrypted version of the electronic data by encrypting the electronic data using the cryptographic vault key an encryption parameter to an encryption algorithm;
   generating vault key secret shares by inputting the cryptographic vault key, the passwords, and the minimum number to a secret sharing algorithm;
   receiving a change request via the graphical user interface to change at least one password of the passwords entered by the corresponding individual;
   in response to the receiving of the change request, receiving the minimum number of the vault key secret shares;
   creating a recreated version of the cryptographic vault key using the minimum number of the vault key secret shares;
   receiving new passwords associated with new authorized individuals; and
   generating new secret shares of the recreated version of the cryptographic vault key by inputting the recreated version of the cryptographic vault key, the new passwords, and the minimum number to the secret sharing algorithm;

wherein the at least one password is changed without decrypting the encrypted version of the electronic data.

8. The system of claim 7, wherein the operations further comprise receiving inputs representing the passwords.

9. The system of claim 7, wherein the operations further comprise prompting for the passwords.

10. The system of claim 7, wherein the operations further comprise receiving an output selection to output a physical version of the cryptographic vault key.

11. The system of claim 7, wherein the operations further comprise receiving an output selection to output a physical version of the encrypted version of the electronic data.

12. The system of claim 7, wherein the operations further comprise storing the cryptographic vault key.

13. The system of claim 7, wherein the operations further comprise storing, by the system, the encrypted version of the electronic data.

14. A memory device storing instructions that, when executed by a hardware processor, facilitate performance of operations that encrypt an electronic data, the operations comprising:

receiving a request via a graphical user interface to execute an encryption operation;

prompting via the graphical user interface to input a number N of authorized individuals that are required for the encryption operation;

in response to the prompting to input the number of the authorized individuals, receiving a first selection via the graphical user interface representing the number N of the authorized individuals required for the encryption operation;

prompting via the graphical user interface to input multiple identity credentials;

in response to the prompting to input the multiple identity credentials, receiving passwords and biometric inputs, each password of the passwords and each biometric input of the biometric inputs entered by a corresponding individual of the authorized individuals;

prompting via the graphical user interface to input a minimum number;

in response to the prompting to input the minimum number, receiving a second selection via the graphical user interface representing the minimum number;

deriving a cryptographic key using only the passwords, the biometric inputs, and the minimum number as inputs to a key derivation function;

generating an encrypted version of the electronic data by encrypting the electronic data using the cryptographic key;

generating key secret shares by inputting the cryptographic key, the passwords, and the minimum number to a secret sharing algorithm;

receiving a request via the graphical user interface to change at least one of the passwords;

receiving new passwords associated with new authorized individuals;

receiving the minimum number of the key secret shares;

creating a recreated version of the cryptographic key using the minimum number of the key secret shares; and generating new secret shares of the recreated version of the cryptographic key by inputting the recreated version of the cryptographic key, the new passwords, and the minimum number to the secret sharing algorithm;

wherein the passwords are changed without decrypting the encrypted version of the electronic data.

* * * * *